United States Patent
Koshimizu et al.

(10) Patent No.: US 10,562,504 B2
(45) Date of Patent: Feb. 18, 2020

(54) MASTER CYLINDER UNIT

(71) Applicant: Hitachi Automotive Systems, Ltd., Hitachinaka-shi, Ibaraki (JP)

(72) Inventors: Naganori Koshimizu, Kai (JP); Hiroshi Owada, Minami-Alps (JP); Chiharu Nakazawa, Kawasaki (JP); Ryohei Maruo, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/746,592

(22) PCT Filed: Jul. 25, 2016

(86) PCT No.: PCT/JP2016/071708
§ 371 (c)(1),
(2) Date: Jan. 22, 2018

(87) PCT Pub. No.: WO2017/022544
PCT Pub. Date: Feb. 9, 2017

(65) Prior Publication Data
US 2018/0215361 A1 Aug. 2, 2018

(30) Foreign Application Priority Data
Jul. 31, 2015 (JP) .................................. 2015-152775

(51) Int. Cl.
*B60T 11/20* (2006.01)
*B60T 8/1769* (2006.01)
(Continued)

(52) U.S. Cl.
CPC ............. *B60T 11/20* (2013.01); *B60T 8/1769* (2013.01); *B60T 8/409* (2013.01); *B60T 11/236* (2013.01); *B60T 13/662* (2013.01); *B60T 17/004* (2013.01)

(58) Field of Classification Search
CPC ...... B60T 11/20; B60T 11/236; B60T 17/004; B60T 8/1769; B60T 8/409
See application file for complete search history.

(56) References Cited

U.S. PATENT DOCUMENTS 4,794,757 A * 1/1989 Schluter .................. B60T 11/20
60/562
5,709,087 A * 1/1998 Hageman .............. B60T 13/145
60/556

(Continued)

FOREIGN PATENT DOCUMENTS

| JP | 2004299568 A | * | 10/2004 | ............ B60T 11/236 |
| JP | 2006123879 A | * | 5/2006 | .............. B60T 11/20 |

(Continued)

OTHER PUBLICATIONS

International Search Report of PCT/JP2016/071708 dated Sep. 13, 2016.

*Primary Examiner* — Xuan Lan Nguyen
(74) *Attorney, Agent, or Firm* — Mattingly & Malur, PC

(57) ABSTRACT

Provided is a master cylinder unit including a communication path that causes a master cylinder and a stroke simulator to communicate with each other. The stroke simulator includes a bottomed tube-shaped simulator piston and a simulator cylinder in which a simulator piston slides. The simulator piston is such that a bottom portion of the simulator cylinder and an opening portion of the simulator piston face each other. The communication path is open over an outer circumferential portion and an inner circumferential portion of the opening portion of the simulator piston, is connected to the bottom portion of the simulator cylinder, and is provided such that the communication path extends upward in a vertical direction from the bottom portion of the simulator cylinder as approaching to a pressure chamber.

5 Claims, 7 Drawing Sheets

(51) Int. Cl.
  *B60T 8/40*   (2006.01)
  *B60T 11/236*  (2006.01)
  *B60T 13/66*   (2006.01)
  *B60T 17/00*   (2006.01)

(56) References Cited

U.S. PATENT DOCUMENTS

| | | | |
|---|---|---|---|
| 6,343,469 B1* | 2/2002 | Penninger | B60T 8/328 |
| | | | 60/422 |
| 6,808,238 B2* | 10/2004 | Drott | B60T 7/042 |
| | | | 188/358 |
| 2013/0127238 A1* | 5/2013 | Masuda | B60T 13/142 |
| | | | 303/6.01 |
| 2014/0000254 A1 | 1/2014 | Murayama et al. | |
| 2015/0175145 A1 | 6/2015 | Nakata et al. | |

FOREIGN PATENT DOCUMENTS

| | | |
|---|---|---|
| JP | 2012-086840 A | 5/2012 |
| JP | 2012-206711 A | 10/2012 |
| JP | 2014-061817 A | 4/2014 |
| JP | 2015-120397 A | 7/2015 |

\* cited by examiner

MASTER CYLINDER UNIT

TECHNICAL FIELD

The present invention relates to a master cylinder unit.
Priority is claimed on Japanese Patent Application No. 2015-152775, filed Jul. 31, 2015, the content of which is incorporated herein by reference.

BACKGROUND ART

There is a braking device which includes a stroke simulator applying a reaction force corresponding to a stepping force of a brake pedal to the brake pedal.

CITATION LIST

Patent Literature

[Patent Literature 1]
Japanese Unexamined Patent Application, First Publication No. 2014-61817

SUMMARY OF INVENTION

Technical Problem

It is desired that a configuration for air bleeding is simplified in a braking device.
An object of the present invention is to provide a master cylinder unit in which a configuration for air bleeding can be simplified.

Solution to Problem

An aspect of the present invention includes a master cylinder that causes a fluid pressure to be generated in a pressure chamber inside a cylinder in accordance with an operation amount of a brake pedal, a reservoir that supplies a brake fluid to the pressure chamber, a stroke simulator that communicates with the pressure chamber and applies a reaction force corresponding to an operation force of the brake pedal to the brake pedal, and a communication path that causes the master cylinder and the stroke simulator to communicate with each other. The stroke simulator includes a bottomed tube-shaped simulator piston and a simulator cylinder in which the simulator piston slides. The simulator piston is disposed such that a bottom portion of the simulator cylinder and an opening portion of the simulator piston face each other. The communication path is open over an outer circumferential portion and an inner circumferential portion of the opening portion of the simulator piston, is connected to the bottom portion of the simulator cylinder, and is provided such that the communication path extends upward in a vertical direction from the bottom portion of the simulator cylinder as approaching to the pressure chamber.

Another aspect of the present invention includes a master cylinder that causes a fluid pressure to be generated in a pressure chamber inside a cylinder in accordance with an operation amount of a brake pedal, a reservoir that supplies a brake fluid to the pressure chamber, a stroke simulator that communicates with the pressure chamber and applies a reaction force corresponding to an operation force of the brake pedal to the brake pedal, and a communication path that causes the master cylinder and the stroke simulator to communicate with each other. The stroke simulator includes a bottomed tube-shaped simulator piston and a simulator cylinder in which the simulator piston slides. The simulator piston is disposed such that a bottom portion of the simulator cylinder and an opening portion of the simulator piston face each other. The communication path is connected to the bottom portion of the simulator cylinder. The bottom portion of the simulator cylinder to which the communication path is connected is recessed and extends radially outward compared to a part to which the communication path is not connected.

Advantageous Effects of Invention

According to the master cylinder unit described above, a configuration for air bleeding can be simplified.

DESCRIPTION OF EMBODIMENTS

First Embodiment

Figure 1:
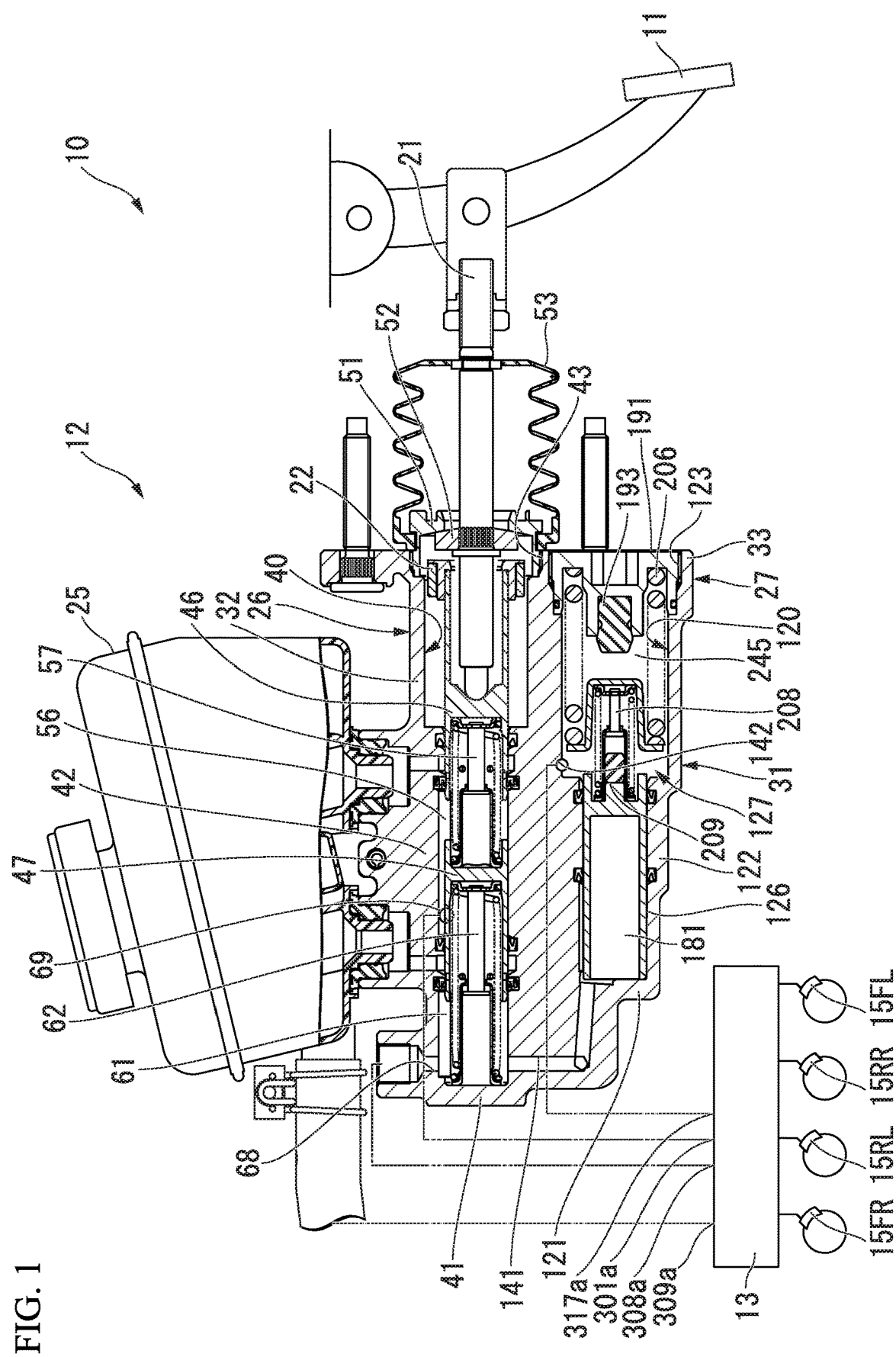
FIG. 1 is a view of a configuration of a braking device including a master cylinder unit of a first embodiment.

A first embodiment will be described below with reference to FIGS. 1 to 6. A braking device 10 illustrated in FIG. 1 is a braking device for a four-wheeled vehicle. The braking device 10 includes a brake pedal 11, a master cylinder unit 12, a power module 13, a braking cylinder 15FR, a braking cylinder 15RL, a braking cylinder 15RR, and a braking cylinder 15FL. The braking cylinder 15FR is a front right wheel braking cylinder provided in a wheel on the front right among four wheels. The braking cylinder 15RL is a rear left wheel braking cylinder provided in a wheel on the rear left among the four wheels. The braking cylinder 15RR is a rear right wheel braking cylinder provided in a wheel on the rear right among the four wheels. The braking cylinder 15FL is a front left wheel braking cylinder provided in a wheel on the front left among the four wheels. The braking cylinders 15FR, 15RL 15RR, and 15FL are fluid pressure actuation mechanisms such as disk brakes and drum brakes applying a brake on rotation of the wheels.

The master cylinder unit 12 has an input rod 21 and a stroke sensor 22. A base end side of the input rod 21 is connected to the brake pedal 11, and the input rod 21 moves in an axial direction in accordance with an operation amount of the brake pedal 11. The stroke sensor 22 detects a movement amount of the input rod 21. The power module 13 generates a brake fluid pressure. Furthermore, the power module 13 controls the brake fluid pressure of each of the braking cylinders 15FR, 15RL, 15RR, and 15FL based on a detection result of the stroke sensor 22 or the like. That is, the braking device 10 is a brake-by-wire-type braking device. Specifically, this braking device 10 is a braking device configuring a sideslip prevention device which prevents a sideslip of a vehicle.

The master cylinder unit 12 includes a reservoir 25, a master cylinder 26, and a stroke simulator 27. The reservoir 25 contains a brake fluid for a brake. The master cylinder 26 is capable of generating a brake fluid pressure corresponding to the operation amount of the brake pedal 11. The master cylinder 26 exchanges the brake fluid with the reservoir 25. The stroke simulator 27 exchanges the brake fluid with the master cylinder 26. The stroke simulator 27 generates a reaction force corresponding to a stepping force, which is an operation force of the brake pedal 11, and applies the reaction force to the brake pedal 11. The reservoir 25 is detachably attached to an upper side of the master cylinder 26 in a vertical direction. The stroke simulator 27 is provided on a lower side of the master cylinder 26 in the vertical direction. The stroke simulator 27 is provided integrally with the master cylinder 26.

Figure 2:
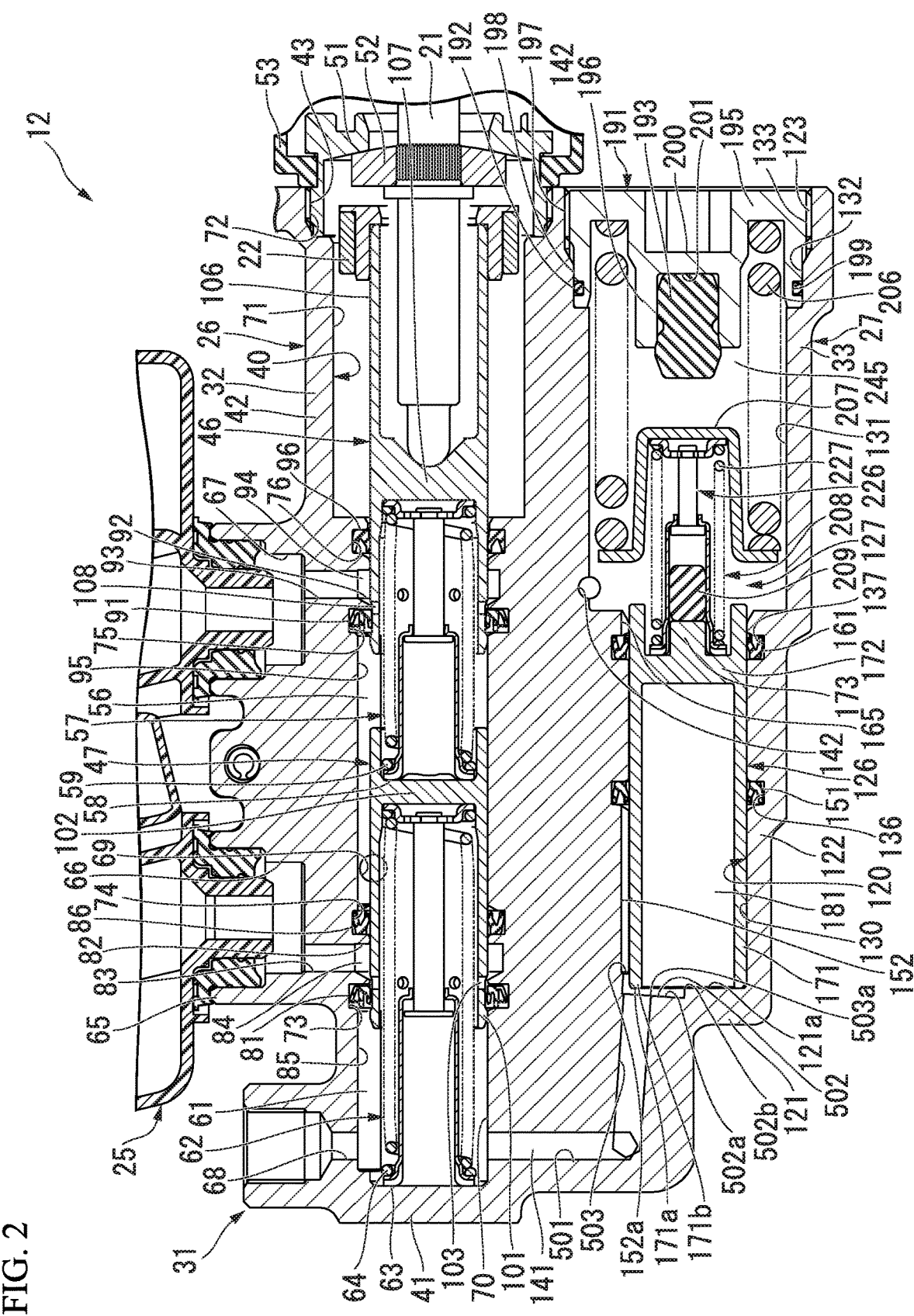
FIG. 2 is a cross-sectional view of the master cylinder unit of the first embodiment.

As illustrated in FIG. 2, the master cylinder unit 12 has a metal cylinder member 31 which is processed and formed of one raw material. This cylinder member 31 is shared by the master cylinder 26 and the stroke simulator 27. In the cylinder member 31, an MC cylinder 32 (cylinder) and an SS cylinder 33 (simulator cylinder) are integrally formed in parallel. The MC cylinder 32 configures the master cylinder 26. The SS cylinder 33 configures the stroke simulator 27. That is, the master cylinder 26 and the stroke simulator 27 are disposed in the cylinder member 31 which is integrally formed of one raw material.

A cylinder hole 40 is formed in the MC cylinder 32 of the master cylinder 26. Thus, the MC cylinder 32 has a cylinder bottom portion 41 and a cylinder wall portion 42. The cylinder bottom portion 41 is on a deep side of the cylinder hole 40. The cylinder wall portion 42 has a tubular shape and extends from the cylinder bottom portion 41 to a cylinder opening 43 on a side opposite to the cylinder bottom portion 41.

A primary piston 46 is installed on the side closer to the cylinder opening 43 in the cylinder wall portion 42 to be movable in the axial direction. The primary piston 46 configures the master cylinder 26 and is made of a metal. In addition, a secondary piston 47 is installed on a side closer to the cylinder bottom portion 41 than the primary piston 46 inside the cylinder wall portion 42 to be movable in the axial direction. The secondary piston 47 configures the master cylinder 26 and is made of a metal, similar to the primary piston 46. As illustrated in FIG. 1, in the primary piston 46 and the secondary piston 47, the primary piston 46 is disposed on a side closer to the brake pedal 11 than the secondary piston 47. In the primary piston 46 and the secondary piston 47, the secondary piston 47 is disposed on a side opposite to the brake pedal 11 of the primary piston 46.

A tip end portion of the input rod 21 on a side opposite to the brake pedal 11 comes into contact with the primary piston 46. The primary piston 46 receives a stepping force of the brake pedal 11 via this input rod 21. The primary piston 46 moves inside the MC cylinder 32 in response to an operation of the brake pedal 11. The stroke sensor 22 is attached to the primary piston 46. The stroke sensor 22 detects the movement amount of the primary piston 46. Accordingly, the stroke sensor 22 detects the movement amount of the input rod 21 which moves integrally with the primary piston 46. That is, the stroke sensor 22 detects the operation amount of the brake pedal 11.

As illustrated in FIG. 2, a tubular stopper member 51 is screwed into an end portion of the cylinder wall portion 42 on a side opposite to the cylinder bottom portion 41. The input rod 21 is inserted through an inner side of this stopper member 51. A flange member 52 is fixed to an intermediate portion of the input rod 21. The stopper member 51 comes into contact with this flange member 52 from the opposite side of the cylinder bottom portion 41. Accordingly, the stopper member 51 determines a movement limit position for the input rod 21 in a direction opposite to the cylinder bottom portion 41. As illustrated in FIG. 1, an extendable boot 53 covering their gap is interposed between the stopper member 51 and the input rod 21.

A space between the primary piston 46 and the secondary piston 47 inside the MC cylinder 32 of the master cylinder 26 serves as a primary pressure chamber 56. In the primary pressure chamber 56, the pressure changes in accordance with movement of the primary piston 46 and the secondary piston 47. A spring unit 57 is provided between the primary piston 46 and the secondary piston 47. The spring unit 57 determines the distance between the primary piston 46 and the secondary piston 47 in a non-braking state having no input from the brake pedal 11. As illustrated in FIG. 2, the spring unit 57 includes a retainer 58 and a primary piston spring 59. The retainer 58 is extendable within a predetermined range. The primary piston spring 59 is a coil spring biasing the retainer 58 in an extending direction. The retainer 58 regulates extension of the primary piston spring 59 such that its maximum length does not exceed a predetermined length. The secondary piston 47 which is connected to the primary piston 46 via the spring unit 57 also moves inside the MC cylinder 32 in response to an operation of the brake pedal 11. The master cylinder 26 has the primary piston 46 and the secondary piston 47 as the master pistons which move inside the MC cylinder 32 in response to an operation of the brake pedal 11.

As illustrated in FIG. 1, a space between the secondary piston 47 and the cylinder bottom portion 41 inside the MC cylinder 32 of the master cylinder 26 serves as a secondary pressure chamber 61 (pressure chamber). In the secondary pressure chamber 61, the pressure changes in accordance with movement of the secondary piston 47. A spring unit 62 is provided between the secondary piston 47 and the cylinder bottom portion 41. The spring unit 62 determines the distance between the secondary piston 47 and the cylinder bottom portion 41 in a non-braking state having no input from the brake pedal 11. As illustrated in FIG. 2, the spring unit 62 includes a retainer 63 and a secondary piston spring 64. The retainer 63 is extendable within a predetermined range. The secondary piston spring 64 is a coil spring biasing the retainer 63 in the extending direction. The retainer 63 regulates extension of the secondary piston spring 64 such that its maximum length does not exceed a predetermined length.

Both the primary piston 46 and the secondary piston 47 have a plunger shape. Thus, the master cylinder 26 is a so-called plunger-type master cylinder. In addition, the master cylinder 26 is a tandem-type master cylinder having two pistons, that is, the primary piston 46 and the secondary piston 47. The present invention is not limited to application to the tandem-type master cylinder. The present invention need only be applied to a plunger-type master cylinder, and can be applied to any plunger-type master cylinder such as a single-type master cylinder in which one piston is disposed in an MC cylinder and a master cylinder having three or more pistons.

An attachment base portion 65 protruding upward in the vertical direction from the cylinder wall portion 42 of the master cylinder 26 is formed integrally with the MC cylinder 32. An attachment hole 66 and an attachment hole 67 for attaching the reservoir 25 are formed in this attachment base portion 65. The attachment hole 66 and the attachment hole 67 are formed such that their positions in a circumferential direction of the cylinder hole 40 coincide with each other. The attachment hole 66 and the attachment hole 67 are formed such that their positions in an axial line direction of the cylinder hole 40 are deviated from each other. The master cylinder unit 12 is disposed in a vehicle such that the axial line direction of the MC cylinder 32 including the cylinder hole 40 of the master cylinder 26 is horizontally disposed along a front/rear direction of the vehicle. The master cylinder unit 12 is disposed in the vehicle in a posture in which the cylinder bottom portion 41 is directed toward the front of the vehicle.

In the cylinder wall portion 42 of the master cylinder 26, a secondary discharge path 68 is formed in the vicinity of the cylinder bottom portion 41. The secondary discharge path 68 extends upward from an upper end position in the vicinity of the cylinder bottom portion 41 such that its central axial line is orthogonal to the central axial line of the cylinder hole 40. In addition, a primary discharge path 69 is formed in the cylinder wall portion 42 of the master cylinder 26 on the side closer to the cylinder opening 43 than the secondary discharge path 68. The central axial line of the primary discharge path 69 is parallel to a direction orthogonal to the central axial line of the cylinder hole 40 and extends horizontally in an in-vehicle state. The secondary discharge path 68 and the primary discharge path 69 communicate with the power module 13 as indicated with the two-dot chain line in FIG. 1. The secondary discharge path 68 and the primary discharge path 69 communicate with the braking cylinders 15FR, 15RL, 15RR, and 15FL via the power module 13. The secondary discharge path 68 and the primary discharge path 69 are configured to be capable of discharging the brake fluids of the secondary pressure chamber 61 and the primary pressure chamber 56 toward the braking cylinders 15FR, 15RL, 15RR, and 15FL. The primary pressure chamber 56 and the secondary pressure chamber 61 communicate with the power module 13.

As illustrated in FIG. 2, in order from the cylinder bottom portion 41 side, a sliding inner diameter portion 70, a large inner diameter portion 71, and a female screw portion 72 are formed in an inner circumferential portion of the cylinder wall portion 42. The sliding inner diameter portion 70 has a cylindrical surface-shaped inner diameter surface. The large inner diameter portion 71 has a cylindrical surface-shaped inner diameter surface having a diameter larger than that of the sliding inner diameter portion 70. The female screw portion 72 has a diameter larger than that of the sliding inner diameter portion 70. The central axial lines of the inner diameter surfaces of the sliding inner diameter portion 70 and the large inner diameter portion 71 coincide with each other. These central axial lines are the central axial lines of the cylinder hole 40 and the cylinder wall portion 42.

The stroke sensor 22 fixed to the primary piston 46 is disposed inside the large inner diameter portion 71. The stroke sensor 22 moves in the axial direction of the MC cylinder 32 inside this large inner diameter portion 71. The primary piston 46 and the secondary piston 47 are slidably fitted to the inner diameter surface of the sliding inner diameter portion 70. The primary piston 46 and the secondary piston 47 are guided along this inner diameter surface and move in the axial direction of the MC cylinder 32.

A plurality of circumferential grooves, specifically four, that is, a circumferential groove 73, a circumferential groove 74, a circumferential groove 75, and a circumferential groove 76 are formed in the sliding inner diameter portion 70, in that order from the cylinder bottom portion 41 side. All the circumferential grooves 73 to 76 are formed in annular shapes and all are formed in circular shapes. The circumferential grooves 73 to 76 have a shape recessed radially outward beyond the inner diameter surface of the sliding inner diameter portion 70.

The circumferential groove 73 is on a side closest to the cylinder bottom portion 41 among the circumferential grooves 73 to 76. The circumferential groove 73 is formed in the vicinity of the attachment hole 66 on the cylinder bottom portion 41 side, in the attachment hole 66 and the attachment hole 67. A circular piston seal 81 is disposed inside this circumferential groove 73 to be held in the circumferential groove 73.

An opening groove 82 is formed on the side closer to the cylinder opening 43 than the circumferential groove 73 in the sliding inner diameter portion 70 of the MC cylinder 32. The opening groove 82 is recessed radially outward beyond the inner diameter surface of the sliding inner diameter portion 70 and is formed in an annular shape. This opening groove 82 causes a supply passage 83 to be open inside the cylinder hole 40. The supply passage 83 has a linear shape in which one end is open inside the attachment hole 66 on the cylinder bottom portion 41 side, and the other end is open inside the cylinder hole 40. Here, the positions of the opening groove 82 and the secondary piston 47 in the axial direction overlap each other, and a part surrounded by these serves as a secondary supply chamber 84. The secondary supply chamber 84 communicates with the reservoir 25 via the supply passage 83 at all times and is formed in an annular shape. A part of the secondary supply chamber 84 is formed by the secondary piston 47.

An axial groove 85 is formed in an upper portion of the MC cylinder 32 on the side closer to the cylinder bottom portion 41 than the circumferential groove 73 of the sliding inner diameter portion 70. The axial groove 85 is open to the circumferential groove 73 and extends linearly from the circumferential groove 73 toward the cylinder bottom portion 41. The axial groove 85 is formed to be recessed radially outward beyond the inner diameter surface of the sliding inner diameter portion 70. This axial groove 85 forms a ceiling part of the secondary pressure chamber 61 between the secondary piston 47 and the cylinder bottom portion 41. The axial groove 85 is formed to cause the secondary discharge path 68 and the circumferential groove 73 to communicate with each other via the secondary pressure chamber 61. The secondary discharge path 68 is formed at a position between the cylinder bottom portion 41 and the circumferential groove 73, and in the vicinity of the cylinder bottom portion 41. The secondary discharge path 68 is formed at an upper end position of the axial groove 85. The secondary discharge path 68 extends upward from an upper end position of the secondary pressure chamber 61.

In the sliding inner diameter portion 70 of the MC cylinder 32, the circumferential groove 74 is formed on a side opposite to the circumferential groove 73 of the opening groove 82, that is, the cylinder opening 43 side. A circular partition seal 86 is disposed inside this circumferential groove 74 to be held in the circumferential groove 74.

In the sliding inner diameter portion 70 of the MC cylinder 32, the circumferential groove 75 is formed in the vicinity of the attachment hole 67 on the cylinder opening 43 side. A circular piston seal 91 is disposed inside this circumferential groove 75 to be held in the circumferential groove 75.

An opening groove 92 is formed on the side closer to the cylinder opening 43 of the circumferential groove 75 in the sliding inner diameter portion 70 of the MC cylinder 32. The opening groove 92 is recessed radially outward beyond the inner diameter surface of the sliding inner diameter portion 70 and is formed in an annular shape. This opening groove 92 causes a supply passage 93 to be open inside the cylinder hole 40. The supply passage 93 has a linear shape in which one end is open inside the attachment hole 67 on the cylinder opening 43 side, and the other end is open inside the cylinder hole 40. Here, the positions of the opening groove 92 and the primary piston 46 in the axial direction overlap each other, and a part surrounded by these serves as a primary supply chamber 94. The primary supply chamber 94 communicates with the reservoir 25 via the supply passage 93 at all times and is formed in an annular shape. A part of the primary supply chamber 94 is formed by the primary piston 46. The master cylinder 26 includes the secondary supply chamber 84 and the primary supply chamber 94 as master supply chambers which are connected to the reservoir 25 at all times.

An axial groove 95 is formed in an upper portion of the MC cylinder 32 on the side closer to the cylinder bottom portion 41 than the circumferential groove 75 of the sliding inner diameter portion 70. The axial groove 95 is open to the circumferential groove 75 and extends linearly from the circumferential groove 75 toward the cylinder bottom portion 41 side. The axial groove 95 is open to the circumferential groove 74. The axial groove 95 is recessed radially outward beyond the inner diameter surface of the sliding inner diameter portion 70. This axial groove 95 forms a ceiling part of the primary pressure chamber 56 between the primary piston 46 and the secondary piston 47. The axial groove 95 is formed to cause the primary discharge path 69 and the circumferential groove 75 to communicate with each other via the primary pressure chamber 56. The primary discharge path 69 is formed at a position between the circumferential groove 74 and the circumferential groove 75, and in the vicinity of the circumferential groove 74. The primary discharge path 69 is formed at an upper end position of the axial groove 95. The primary discharge path 69 extends laterally from the upper end position of the primary pressure chamber 56.

In the sliding inner diameter portion 70 of the MC cylinder 32, the circumferential groove 76 is formed on a side opposite to the circumferential groove 75 of the opening groove 92, that is, the cylinder opening 43. A circular partition seal 96 is disposed inside this circumferential groove 76 to be held in the circumferential groove 76.

The secondary piston 47 is disposed on the side closer to the cylinder bottom portion 41 than the primary piston 46 of the MC cylinder 32. The secondary piston 47 includes a cylindrical portion 101 and a bottom portion 102 formed at an intermediate position of the cylindrical portion 101 in the axial line direction, and has a plunger shape. The cylindrical portion 101 of the secondary piston 47 is fitted to each of the sliding inner diameter portion 70 of the MC cylinder 32, the piston seal 81 provided in the sliding inner diameter portion 70, and the partition seal 86. The secondary piston 47 is guided by these and slides inside the MC cylinder 32.

A plurality of ports 103 are formed at the end portion of the cylindrical portion 101 on the side closer to the cylinder bottom portion 41. The plurality of ports 103 radially penetrates the cylindrical portion 101. The plurality of ports 103 are formed in the cylindrical portion 101 in a radial manner at positions having equal intervals in the circumferential direction. The spring unit 62 is inserted into the secondary piston 47 of the cylinder bottom portion 41 side of the cylindrical portion 101. In the spring unit 62, one end of the retainer 63 in the axial direction comes into contact with the bottom portion 102 of the secondary piston 47, and the other end of the retainer 63 in the axial direction comes into contact with the cylinder bottom portion 41 of the MC cylinder 32. The secondary piston spring 64 determines the distance between the secondary piston 47 and the cylinder bottom portion 41 in a non-braking state having no input from the input rod 21. The secondary piston spring 64 is reduced in length when there is an input from the input rod 21, and biases the secondary piston 47 toward the cylinder opening 43 using a force corresponding to the reduced length.

Here, a part surrounded by the cylinder bottom portion 41, the cylinder bottom portion 41 side of the cylinder wall portion 42, and the secondary piston 47 serves as the secondary pressure chamber 61. The secondary pressure chamber 61 generates a brake fluid pressure in accordance with the operation amount of the brake pedal 11 and supplies the brake fluid pressure to the secondary discharge path 68. In other words, the master cylinder 26 causes a fluid pressure to be generated in the secondary pressure chamber 61 inside the MC cylinder 32 in accordance with the operation amount of the brake pedal 11. This secondary pressure chamber 61 communicates with the secondary supply chamber 84, that is, the reservoir 25, when the secondary piston 47 is at a position in which the ports 103 are open to the opening groove 82. The secondary piston 47 causes the ports 103 to be open to the opening groove 82 when the brake pedal 11 is not in operation. In other words, the secondary supply chamber 84 included in the master cylinder 26 is connected to the reservoir 25 at all times and communicates with the secondary pressure chamber 61 when the brake pedal 11 is not in operation. The reservoir 25 stores a brake fluid to be supplied to the secondary pressure chamber 61 in this manner. The reservoir 25 supplies the brake fluid to the secondary pressure chamber 61.

The partition seal 86 held by the circumferential groove 74 of the MC cylinder 32 is an integrally molded product made of synthetic rubber. The partition seal 86 is a cup seal of which the shape on one side of a radial cross-section including its central line is a C-shape. The partition seal 86 is disposed inside the circumferential groove 74 in which a lip part is in a state of being directed toward the cylinder opening 43. In the partition seal 86, the inner circumference is in slide contact with an outer circumferential surface of the secondary piston 47, and the outer circumference comes into contact with the circumferential groove 74 of the MC cylinder 32. Accordingly, the partition seal 86 seals the gap at the position of the partition seal 86 of the secondary piston 47 and the MC cylinder 32 at all times.

The piston seal 81 held by the circumferential groove 73 of the MC cylinder 32 is an integrally molded product made of synthetic rubber such as EPDM. The piston seal 81 is a cup seal of which the shape on one side of a radial cross-section including its central line is an E-shape. The piston seal 81 is disposed inside the circumferential groove 73 in which a lip part is in a state of being directed toward the cylinder bottom portion 41. In the piston seal 81, the inner circumference is in slide contact with the outer circumferential surface of the secondary piston 47, and the outer circumference comes into contact with the circumferential groove 73 of the MC cylinder 32. Accordingly, the piston seal 81 is capable of sealing the gap at the position of the piston seal 81 of the secondary piston 47 and the MC cylinder 32.

The secondary piston 47 is at a non-braking position in which the ports 103 are open to the opening groove 82, when there is no input from the input rod 21. The piston seal 81 partially overlaps the ports 103 in the axial direction when the secondary piston 47 is at a non-braking position as illustrated in FIG. 2. In this state, the secondary pressure chamber 61 and the reservoir 25 communicate with each other via the secondary supply chamber 84 and the ports 103.

In response to an input from the input rod 21, the primary piston 46 moves toward the cylinder bottom portion 41 along its axial direction. Consequently, the secondary piston 47 is pressed by the primary piston 46 via the spring unit 57 and moves toward the cylinder bottom portion 41 along its axial direction. That is, the primary piston 46 linearly moves inside the MC cylinder 32 in response to a stepping force of the brake pedal 11 illustrated in FIG. 1. The secondary piston 47 also linearly moves inside the MC cylinder 32 in response to a stepping force of the brake pedal 11.

In this case, as illustrated in FIG. 2, the secondary piston 47 slides on the inner circumference of the sliding inner diameter portion 70 of the MC cylinder 32, and on the inner circumference of the piston seal 81 and the partition seal 86 held by the MC cylinder 32. When the secondary piston 47 moves toward the cylinder bottom portion 41, the ports 103 are in a state of being positioned on the side closer to the cylinder bottom portion 41 than the piston seal 81. In this state, the piston seal 81 is in a state of sealing a gap between the reservoir 25 and the secondary supply chamber 84, and the secondary pressure chamber 61. As a result, when the secondary piston 47 further moves toward the cylinder bottom portion 41, the brake fluid inside the secondary pressure chamber 61 is pressurized. The brake fluid pressurized inside the secondary pressure chamber 61 is discharged from the secondary discharge path 68.

When an input from the input rod 21 is reduced from a state in which the brake fluid inside the secondary pressure chamber 61 is pressurized, the secondary piston 47 tends to return to the cylinder opening 43 side due to a biasing force of the secondary piston spring 64 of the spring unit 62. The volumetric capacity of the secondary pressure chamber 61 increases due to this movement of the secondary piston 47. In this case, a return of the brake fluid to the secondary pressure chamber 61 via the secondary discharge path 68 sometimes does not follow the increase of the volumetric capacity of the secondary pressure chamber 61 any longer. Consequently, after the fluid pressure of the secondary supply chamber 84, that is the atmospheric pressure, and the fluid pressure of the secondary pressure chamber 61 become equal to each other, the fluid pressure inside the secondary pressure chamber 61 becomes a negative pressure.

Consequently, due to this negative pressure inside the secondary pressure chamber 61, the piston seal 81 is deformed and a gap is formed between the piston seal 81 and the circumferential groove 73. Accordingly, the brake fluid of the secondary supply chamber 84 passes through this gap and is supplied to the secondary pressure chamber 61. Accordingly, the speed of the fluid pressure of the secondary pressure chamber 61 returning to the atmospheric pressure from the negative pressure state increases. That is, the piston seal 81 is a check valve which allows the brake fluid of the secondary supply chamber 84 to flow to the secondary pressure chamber 61 and regulates the flow of the brake fluid in the opposite direction thereof.

The primary piston 46 is disposed on the side closer to the cylinder opening 43 than the secondary piston 47 of the MC cylinder 32. The primary piston 46 includes a cylindrical portion 106 and a bottom portion 107 formed at an intermediate position of the cylindrical portion 106 in the axial line direction, and has a plunger shape. The primary piston 46 is fitted to each of the sliding inner diameter portion 70 of the MC cylinder 32, the piston seal 91 provided in the sliding inner diameter portion 70, and the partition seal 96. The primary piston 46 is guided by these and slides inside the MC cylinder 32. The input rod 21 is inserted into the cylindrical portion 106. The bottom portion 107 is pressed by this input rod 21, and the primary piston 46 moves forward to the cylinder bottom portion 41.

A plurality of ports 108 are formed on the cylinder bottom portion 41 side of the cylindrical portion 106. The plurality of ports 108 radially penetrates the cylindrical portion 106. The plurality of ports 108 are formed in the cylindrical portion 106 in a radial manner at positions having equal intervals in the circumferential direction. The spring unit 57 is provided on the secondary piston 47 side of the primary piston 46. The spring unit 57 determines the distance between the primary piston 46 and the secondary piston 47 in a non-braking state having no input from the input rod 21. In the spring unit 57, the retainer 58 comes into contact with the bottom portion 102 of the secondary piston 47 and the bottom portion 107 of the primary piston 46. The primary piston spring 59 is reduced in length when there is an input from the input rod 21 and the distance between the primary piston 46 and the secondary piston 47 is reduced. The primary piston spring 59 biases the primary piston 46 toward the input rod 21 using a force corresponding to the reduced length.

Here, a part formed by being surrounded by the cylinder wall portion 42, the primary piston 46, and the secondary piston 47 of the MC cylinder 32 serves as the primary pressure chamber 56. The primary pressure chamber 56 generates a brake fluid pressure in accordance with the operation amount of the brake pedal 11 and supplies the brake fluid to the primary discharge path 69. In other words, the master cylinder 26 causes a fluid pressure to be generated in the primary pressure chamber 56 inside the MC cylinder 32 in accordance with the operation amount of the brake pedal 11. Moreover, in other words, the primary piston 46 forms the primary pressure chamber 56 for supplying the fluid pressure to the primary discharge path 69 between the secondary piston 47 and the MC cylinder 32. This primary pressure chamber 56 communicates with the primary supply chamber 94, that is, the reservoir 25, when the primary piston 46 is at a position in which the ports 108 are open to the opening groove 92 as illustrated in FIG. 2. The primary piston 46 causes the ports 108 to be open to the opening groove 92 when the brake pedal 11 is not in operation. In other words, the primary supply chamber 94 included in the master cylinder 26 is connected to the reservoir 25 at all times and communicates with the primary pressure chamber 56 when the brake pedal 11 is not in operation. The reservoir 25 stores a brake fluid to be supplied to the primary pressure chamber 56 in this manner. The reservoir 25 supplies the brake fluid to the primary pressure chamber 56.

The partition seal 96 held by the circumferential groove 76 of the MC cylinder 32 is a component in common with the partition seal 86, which is an integrally molded product made of synthetic rubber. The partition seal 96 is a cup seal of which the shape on one side of a radial cross-section including its central line is a C-shape. The partition seal 96 is disposed inside the circumferential groove 76 in which a lip part is in a state of being directed toward the cylinder bottom portion 41 side. In the partition seal 96, the inner circumference is in slide contact with the outer circumferential surface of the moving primary piston 46, and the outer circumference comes into contact with the circumferential groove 76 of the MC cylinder 32. Accordingly, the partition seal 96 seals the gap at the position of the partition seal 96 of the primary piston 46 and the MC cylinder 32 at all times.

The piston seal 91 held by the circumferential groove 75 of the MC cylinder 32 is a component in common with the piston seal 81, which is an integrally molded product made of synthetic rubber such as EPDM. The piston seal 91 is a cup seal of which the shape on one side of a radial cross-section including its central line is an E-shape. The piston seal 91 is disposed inside the circumferential groove 75 in which a lip part is in a state of being directed toward the cylinder bottom portion 41. In the piston seal 91, the inner circumference is in slide contact with the outer circumferential surface of the primary piston 46, and the outer circumference comes into contact with the circumferential groove 75 of the MC cylinder 32. Accordingly, the piston seal 91 can seal the gap at the position of the piston seal 91 of the primary piston 46 and the MC cylinder 32.

The primary piston 46 is at a non-braking position in which the ports 108 are open to the opening groove 92, when there is no input from the input rod 21. The piston seal 91 partially overlaps the ports 108 of the primary piston 46 in the axial direction when the primary piston 46 is at a non-braking position. In this state, the primary pressure chamber 56 and the reservoir 25 communicate with each other via the primary supply chamber 94 and the ports 108.

In response to an input from the input rod 21, the primary piston 46 moves toward the cylinder bottom portion 41 along its axial direction. In this case, the primary piston 46 slides on the inner circumference of the sliding inner diameter portion 70 of the MC cylinder 32, and on the inner circumference of the piston seal 91 and the partition seal 96 held by the MC cylinder 32. When the primary piston 46 moves toward the cylinder bottom portion 41, the ports 108 are in a state of being positioned on the side closer to the cylinder bottom portion 41 than the piston seal 91. In this state, the piston seal 91 is in a state of sealing a gap between the reservoir 25 and the primary supply chamber 94, and the primary pressure chamber 56. Accordingly, when the primary piston 46 further moves toward the cylinder bottom portion 41, the brake fluid inside the primary pressure chamber 56 is pressurized. The brake fluid pressurized inside the primary pressure chamber 56 is discharged from the primary discharge path 69.

When an input from the input rod 21 is reduced from a state in which the brake fluid inside the primary pressure chamber 56 is pressurized, the primary piston 46 tends to return to a side opposite to the cylinder bottom portion 41 due to a biasing force of the primary piston spring 59 of the spring unit 57. The volumetric capacity of the primary pressure chamber 56 increases due to this movement of the primary piston 46. In this case, a return of the brake fluid via the primary discharge path 69 sometimes does not follow the increase of the volumetric capacity of the primary pressure chamber 56 any longer. Consequently, after the fluid pressure of the primary supply chamber 94, that is the atmospheric pressure, and the fluid pressure of the primary pressure chamber 56 become equal to each other, the fluid pressure inside the primary pressure chamber 56 becomes a negative pressure.

Consequently, due to this negative pressure inside the primary pressure chamber 56, the piston seal 91 is deformed and a gap is formed between the piston seal 91 and the circumferential groove 75. Accordingly, the brake fluid of the primary supply chamber 94 passes through this gap and is supplied to the primary pressure chamber 56. Accordingly, the speed of the fluid pressure of the primary pressure chamber 56 returning to the atmospheric pressure from the negative pressure state increases. That is, the piston seal 91 is a check valve which allows the brake fluid of the primary supply chamber 94 to flow to the primary pressure chamber 56 and regulates the flow of the brake fluid in the opposite direction thereof.

A cylinder hole 120 parallel to the cylinder hole 40 of the MC cylinder 32 is formed in the SS cylinder 33 of the stroke simulator 27. Thus, the SS cylinder 33 includes a cylinder bottom portion 121 (bottom portion of the simulator cylinder) and a cylinder wall portion 122. The cylinder bottom portion 121 is on a deep side in the cylinder hole 120. The cylinder wall portion 122 has a tubular shape and extends from the cylinder bottom portion 121 to a cylinder opening 123 on a side opposite to the cylinder bottom portion 121. The master cylinder unit 12 is disposed in a vehicle such that the axial line direction of the SS cylinder 33 including the cylinder hole 120 of the stroke simulator 27 is horizontally disposed along the front/rear direction of the vehicle. The master cylinder unit 12 is disposed in the vehicle in a posture in which the cylinder bottom portion 121 is directed toward the front of the vehicle. The cylinder hole 40 and the cylinder hole 120 are formed on the same side surface side of the cylinder member 31, and the positions of their central axial lines in a horizontal direction coincide with each other. In other words, vertically below the central axial line of the cylinder hole 40, the central axial line of the cylinder hole 120 is disposed in parallel thereto. The position of the cylinder opening 123 of the SS cylinder 33 in the axial direction coincides with that of the cylinder opening 43 of the MC cylinder 32. The position of the cylinder bottom portion 121 of the SS cylinder 33 in the axial direction is deviated to the side closer to the cylinder openings 43 and 123 than the cylinder bottom portion 41 of the MC cylinder 32.

Figure 4:
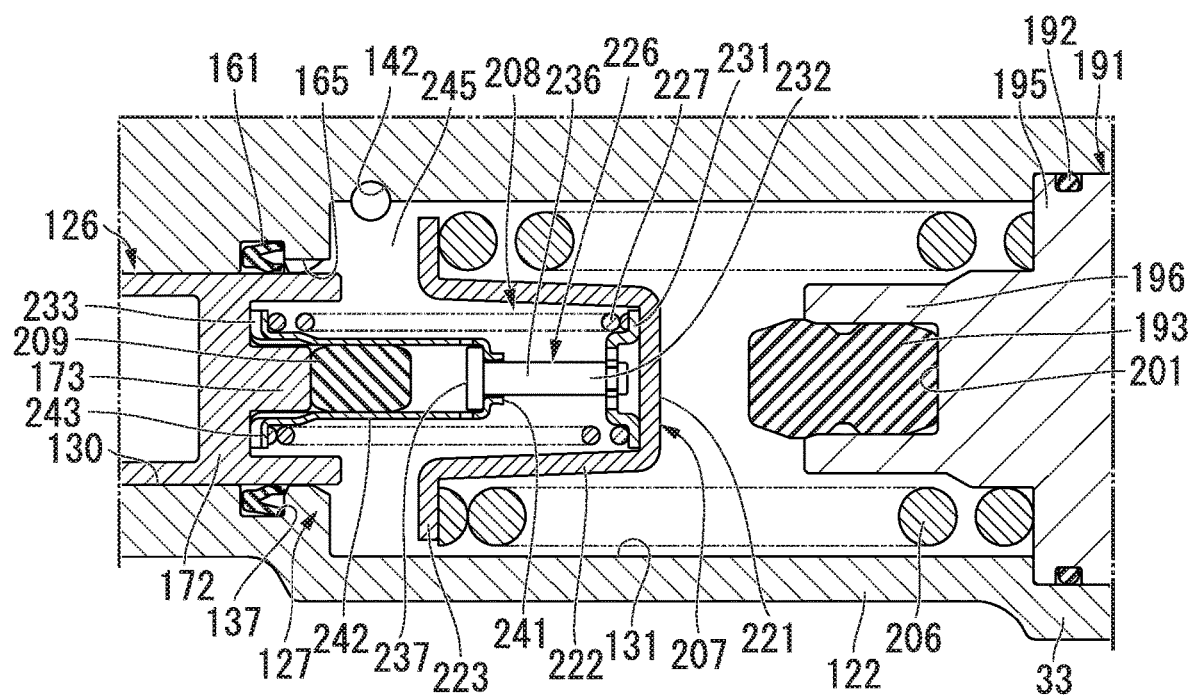
FIG. 4 is a partial cross-sectional view of the master cylinder unit of the first embodiment.

An SS piston 126 (simulator piston) is movably installed on the side closer to the cylinder bottom portion 121 in the cylinder wall portion 122. The SS piston 126 configures the stroke simulator 27 and is made of a metal. The SS piston 126 slides inside the SS cylinder 33. The SS cylinder 33 is a part in which the SS piston 126 slides in the stroke simulator 27. In addition, a reaction force generating mechanism 127 illustrated in FIG. 4 is provided on the side closer to the cylinder opening 123 than the SS piston 126 inside the cylinder wall portion 122. As illustrated in FIG. 2, the reaction force generating mechanism 127 biases the SS piston 126 toward the cylinder bottom portion 121.

In order from the cylinder bottom portion 121 side, a sliding inner diameter portion 130, an intermediate inner diameter portion 131, a large inner diameter portion 132, and a female screw portion 133 are formed in the inner circumferential portion of the cylinder wall portion 122. The sliding inner diameter portion 130 has a cylindrical surface-shaped inner diameter surface. The intermediate inner diameter portion 131 has a cylindrical surface-shaped inner diameter surface having a diameter larger than that of the sliding inner diameter portion 130. In the large inner diameter portion 132, the inner diameter surface has a diameter larger than that of the intermediate inner diameter portion 131. The central axial lines of the inner diameter surfaces of the sliding inner diameter portion 130, the intermediate inner diameter portion 131, and the large inner diameter portion 132 coincide with each other. These central axial lines are the central axial lines of the cylinder hole 120 and the cylinder wall portion 122.

A plurality of circumferential grooves, specifically two, that is, a circumferential groove 136 and a circumferential groove 137 are formed in the sliding inner diameter portion 130, in that order from the cylinder bottom portion 121 side. Both the circumferential grooves 136 and 137 are formed in annular shapes and both thereof are formed in circular shapes. The circumferential grooves 136 and 137 have a shape recessed radially outward beyond the inner diameter surface of the sliding inner diameter portion 130.

A communication path 141 is formed at a position on the boundary between the cylinder wall portion 122 and the cylinder bottom portion 121. The communication path 141 extends upward from an upper end portion of the cylinder hole 120 in the vicinity of the cylinder bottom portion 121 and is open inside the secondary pressure chamber 61 of the master cylinder 26. In other words, the communication path 141 causes the cylinder hole 40 and the cylinder hole 120 to communicate with each other. Moreover, in other words, the stroke simulator 27 communicates with the secondary pressure chamber 61 via the communication path 141. The communication path 141 causes the master cylinder 26 and the stroke simulator 27 to communicate with each other. The communication path 141 is connected to the cylinder bottom portion 121.

A bleeder passage 142 is formed in the cylinder wall portion 122. The bleeder passage 142 is open to an upper portion of the intermediate inner diameter portion 131 on the side closer to the sliding inner diameter portion 130. The bleeder passage 142 extends to a position on an outer surface of the cylinder member 31. A bleeder plug (not illustrated) for opening and closing the bleeder passage 142 is disposed in this part of the bleeder passage 142. The bleeder plug throws the bleeder passage 142 open to outside air in an opened state and blocks the bleeder passage 142 from outside air in a closed state. As indicated with the two-dot chain line in FIG. 1, the bleeder passage 142 also communicates with the power module 13.

As illustrated in FIG. 2, a circular partition seal 151 (seal member) is disposed inside the circumferential groove 136 (annular groove) to be held in the circumferential groove 136. The partition seal 151 also configures the stroke simulator 27. The partition seal 151 is disposed on the SS cylinder 33 side, in the SS cylinder 33 and the SS piston 126. Here, the partition seal 151 may be disposed on the SS piston 126 side, in the SS cylinder 33 and the SS piston 126.

Figure 3:
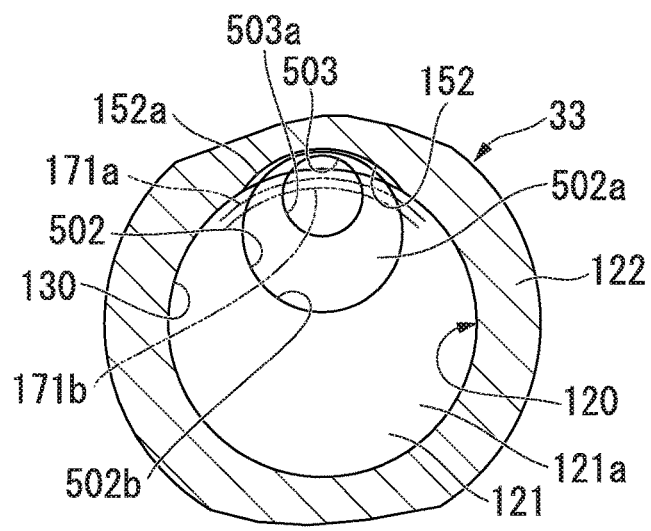
FIG. 3 is a cross-sectional view of an SS cylinder of the master cylinder unit of the first embodiment.

An axial groove 152 (recess portion) is formed in an upper portion of the SS cylinder 33 on the side closer to the cylinder bottom portion 121 than the circumferential groove 136 of the sliding inner diameter portion 130. The axial groove 152 is open to the circumferential groove 136 and extends linearly from the circumferential groove 136 toward the cylinder bottom portion 121. The axial groove 152 is a recess portion which is recessed radially outward beyond the inner diameter surface of the sliding inner diameter portion 130. As illustrated in FIG. 3, in the cylinder bottom portion 121, a main bottom surface 121a having the largest area on the bottom surface is formed to be a flat surface orthogonal to the central axial line of the cylinder hole 120 as illustrated in FIG. 2. The axial groove 152 is formed from the circumferential groove 136 to a position slightly closer to the cylinder opening 123 than the position of this main bottom surface 121a.

In the sliding inner diameter portion 130 of the SS cylinder 33, the circumferential groove 137 is formed in the vicinity of the end portion closer to the cylinder opening 123. A circular partition seal 161 is disposed inside this circumferential groove 137 to be held in the circumferential groove 137. The partition seal 161 is disposed on the SS cylinder 33 side, in the SS cylinder 33 and the SS piston 126. The partition seal 161 may be disposed on the SS piston 126 side, in the SS cylinder 33 and the SS piston 126.

In the partition seals 151 and 161, the partition seal 151 is disposed on the front side of the partition seal 161 (forward movement direction side) in a traveling direction of the input rod 21, the primary piston 46, and the secondary piston 47 at the time of stepping on the brake pedal 11. The partition seal 161 is disposed on the rear side of the partition seal 151 (rearward movement direction side) in the traveling direction of the input rod 21, the primary piston 46, and the secondary piston 47 at the time of stepping on the brake pedal 11.

An axial groove 165 is formed in an upper portion of the SS cylinder 33 on the side closer to the cylinder opening 123 than the circumferential groove 137 of the sliding inner diameter portion 130. The axial groove 165 has one end open to the circumferential groove 137 and extends linearly from the circumferential groove 137 toward the cylinder opening 123. The axial groove 165 is formed to be recessed radially outward beyond the inner diameter surface of the sliding inner diameter portion 130.

As illustrated in FIG. 3, in the axial groove 152, the shape of a cross section on a surface orthogonal to the central axial line of the sliding inner diameter portion 130 is an arc shape. This arc has a diameter smaller than that of the inner diameter surface of the sliding inner diameter portion 130. The axial groove 152 is an eccentric groove in which the center of the arc is offset with respect to the center of the inner diameter surface of the sliding inner diameter portion 130. Similarly, the axial groove 165 is also an eccentric groove in which the shape of a cross section on a surface orthogonal to the central axial line of the sliding inner diameter portion 130 is an arc shape having a diameter smaller than that of the inner diameter surface of the sliding inner diameter portion 130 (not illustrated). The axial grooves 85 and 95 of the master cylinder 26 are also eccentric grooves in which the shape of a cross section on a surface orthogonal to the central axial line of the sliding inner diameter portion 70 is an arc shape having a diameter smaller than that of the inner diameter surface of the sliding inner diameter portion 70.

Figure 5:
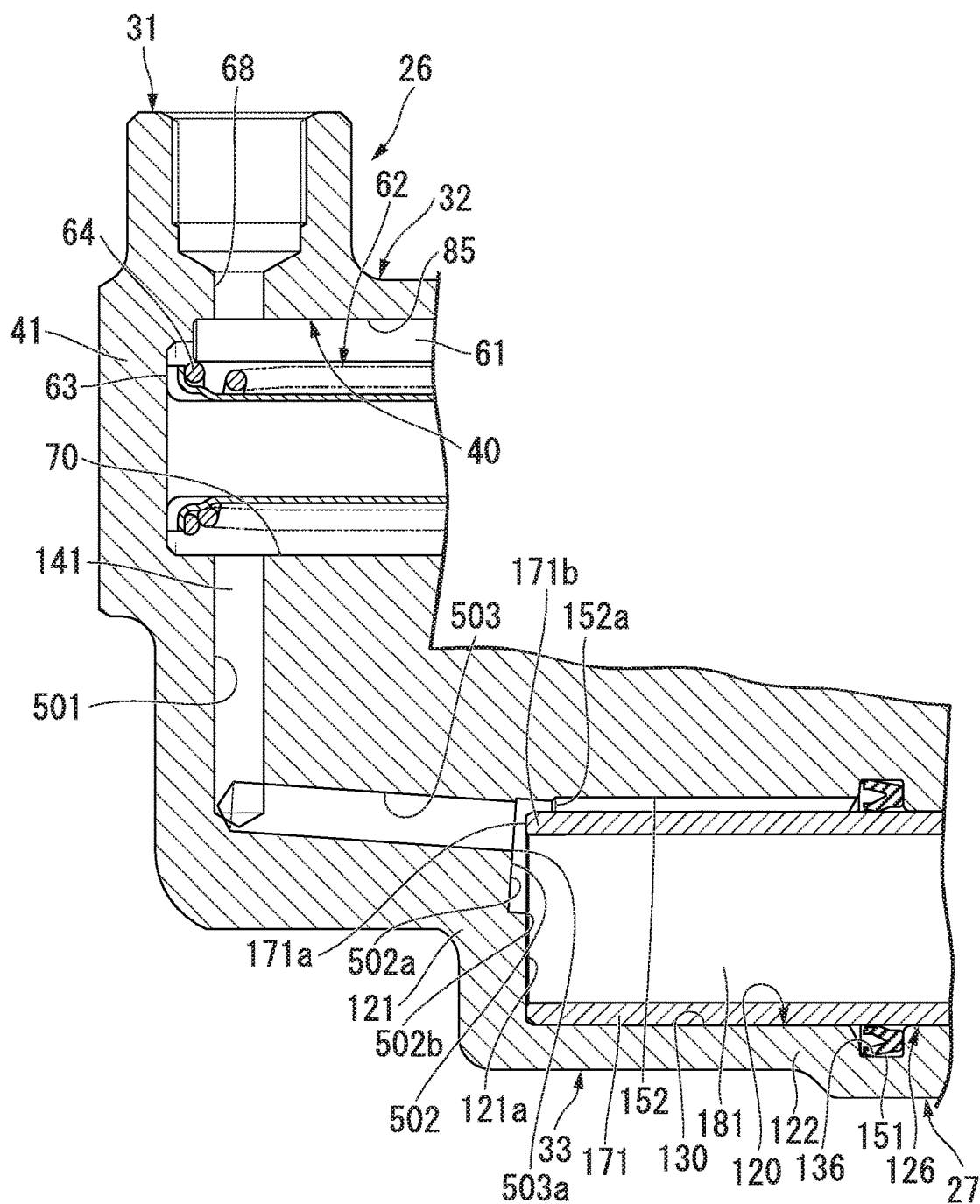
FIG. 5 is a partial cross-sectional view of the master cylinder unit of the first embodiment.

As illustrated in FIG. 5 the communication path 141 is formed of a passage hole 501, a recess portion 502, and a passage hole 503. The passage hole 501 is linearly formed and extends downward in the vertical direction from the cylinder hole 40. The passage hole 501 has a circular cross-sectional shape and is formed on the same straight line as the secondary discharge path 68. The passage hole 501 is formed coaxially with the secondary discharge path 68 while having the same diameter. Thus, the secondary discharge path 68 and the passage hole 501 are formed through hole opening performed once using one drill. In the passage hole 501, similar to the secondary discharge path 68, the central axial line is also orthogonal to the central axial line of the cylinder hole 40.

As illustrated in FIG. 3, the recess portion 502 has a circular cross-sectional shape having a diameter slightly smaller than the diameter of the axial groove 152. As illustrated in FIG. 2, the recess portion 502 is provided in the upper portion of the cylinder hole 120. The recess portion 502 is recessed on a side opposite to the cylinder opening 123 beyond an end surface 152a of the axial groove 152 and the main bottom surface 121a of the cylinder bottom portion 121. The position of the central axial line of the recess portion 502 in the horizontal direction overlaps the positions of the central axial line of the inner diameter surface of the sliding inner diameter portion 130 and the central axial line of the axial groove 152. The central axial line of the recess portion 502 is inclined with respect to the central axial line of the cylinder hole 120 to be closer to the central axial line of the cylinder hole 40 of the master cylinder 26 as the central axial line becoming farther from the cylinder opening 123. The recess portion 502 is formed by an end milling cutter which is inserted through the cylinder opening 123. A bottom surface 502a of the recess portion 502 is orthogonal to the central axial line of the recess portion 502.

The passage hole 503 is linearly formed in the upper portion of the recess portion 502 and extends to a side opposite to the cylinder opening 123 from the bottom surface 502a. The passage hole 503 communicates with the passage hole 501. The passage hole 503 has a circular cross-sectional shape. The position of the central axial line of the passage hole 503 in the horizontal direction overlaps the positions of the central axial line of the inner diameter surface of the sliding inner diameter portion 130 and the central axial line of the axial groove 152. The central axial line of the passage hole 503 is parallel to the central axial line of the recess portion 502. That is, the central axial line of the passage hole 503 is inclined with respect to the central axial line of the cylinder hole 120 to be closer to the central axial line of the cylinder hole 40 of the master cylinder 26 as the central axial line becoming farther from the cylinder opening 123. The passage hole 503 is formed by a drill or the like which is inserted through the cylinder opening 123. At this time, a tip end portion of the drill moves forward within a range of the passage hole 501 and then moves rearward.

Here, the central axial line of the cylinder hole 120 is horizontally disposed. Therefore, the recess portion 502 and the passage hole 503 are inclined to be positioned on the upper side in the vertical direction as the recess portion 502 and the passage hole 503 becoming farther from the cylinder opening 123. The axial groove 152 communicates with the recess portion 502. Thus, the axial groove 152 communicates with the communication path 141 configured of the recess portion 502 and the passage holes 501 and 503. The cylinder bottom portion 121 to which the communication path 141 is connected is recessed in the axial direction of the SS cylinder 33 compared to a part to which the communication path 141 is not connected. In the cylinder bottom portion 121 to which the communication path 141 is connected, the communication path 141 formed therein extends radially outward.

The SS piston 126 has a cylindrical portion 171, a piston bottom portion 172 (simulator piston bottom portion) formed at an intermediate position of the cylindrical portion 171 in the axial direction, and a protrusion portion 173 protruding from the piston bottom portion 172 in the axial direction. The piston bottom portion 172 is deviated to one side from the middle of the cylindrical portion 171 in the axial direction. The protrusion portion 173 protrudes from the piston bottom portion 172 in the direction in which the piston bottom portion 172 is deviated with respect to the middle of the cylindrical portion 171. An end portion of the cylindrical portion 171 on a side opposite to the protrusion portion 173 is a piston opening 171b (opening portion of the simulator piston) in an open state. The SS piston 126 has a bottomed tube shape, in other words, a plunger shape. In the SS piston 126, the cylindrical portion 171 is fitted to each of the sliding inner diameter portion 130 of the SS cylinder 33, and the partition seals 151 and 161 provided in the sliding inner diameter portion 130. The SS piston 126 is guided by these and slides inside the SS cylinder 33. In this case, both the partition seals 151 and 161 annularly seal a gap between the inner circumference of the SS cylinder 33 and the outer circumference of the SS piston 126. The partition seals 151 and 161 are provided between the outer circumferential portion of the SS piston 126 and the SS cylinder 33. The SS piston 126 is disposed in the SS cylinder 33 such that its piston opening 171b faces the cylinder bottom portion 121. In the SS piston 126, the piston bottom portion 172 is formed on the side closer to the cylinder opening 123 than the middle of the cylindrical portion 171 in the axial direction. The protrusion portion 173 protrudes from the piston bottom portion 172 toward the cylinder opening 123. The partition seal 151 partitions the piston bottom portion 172 and the piston opening 171b in the SS piston 126. In the SS cylinder 33, the axial groove 152 is provided in a part closer to the piston bottom portion 172 than the cylinder bottom portion 121. The axial groove 152 is a recess portion which is recessed radially outward beyond the piston opening 171b side in the SS cylinder 33. The axial groove 152 is provided from the partition seal 151 to the cylinder bottom portion 121. Ports radially penetrating the cylindrical portion 171 are not formed in the SS piston 126.

As illustrated in FIG. 5, in the SS piston 126, an end surface 171a of the cylindrical portion 171 close to the cylinder bottom portion 121 is a flat surface along a direction orthogonal to the axis and has a circular shape. The SS piston 126 comes into surface contact with the main bottom surface 121a of the cylinder bottom portion 121 on this end surface 171a. An end edge portion 502b on the boundary with respect to the main bottom surface 121a of the recess portion 502 is at a position radially crossing the end surface 171a of the cylindrical portion 171 of the SS piston 126 as illustrated in FIG. 3. Thus, although the SS piston 126 is in a state of being in contact with the cylinder bottom portion 121 as illustrated in FIG. 5, the communication path 141 including the recess portion 502 is simultaneously open to an inner circumferential side and an outer circumferential side of the SS piston 126 and communicates with both thereof. As a result, although the SS piston 126 is in a state of being in contact with the cylinder bottom portion 121, the communication path 141 causes the axial groove 152 and the inside of the cylindrical portion 171 to communicate with each other. That is, the communication path 141 including the recess portion 502 communicates with the inner circumferential side and the outer circumferential side of the SS piston 126 at all times regardless of the position of the SS piston 126. The communication path 141 causes the axial groove 152 and the inside of the cylindrical portion 171 to communicate with each other at all times. Here, the boundary between the passage hole 503 and the bottom surface 502a of the recess portion 502 is an end edge portion 503a. The end edge portion 503a is also at a position radially crossing the end surface 171a of the cylindrical portion 171 of the SS piston 126 as illustrated in FIG. 3. As illustrated in FIG. 2, the recess portion 502 and the passage hole 503 are inclined to be positioned on the upper side in the vertical direction as the recess portion 502 and the passage hole 503 being farther from the cylinder opening 123. The passage hole 501 extends upward from the passage hole 503 in the vertical direction. Thus, the communication path 141 is provided such that the communication path 141 extends upward in the vertical direction from the cylinder bottom portion 121 as approaching to the secondary pressure chamber 61.

As described above, the communication path 141 illustrated in FIG. 5 includes the recess portion 502, the passage hole 503, and the passage hole 501 in the cylinder bottom portion 121. The cylinder bottom portion 121 is a facing portion which faces the tip end portion of the SS piston 126 in the SS cylinder 33. The cylinder bottom portion 121 faces an opening portion 171b of the SS piston 126. The recess portion 502 is provided to be recessed in a direction of being apart from the tip end portion of the SS piston 126. The passage hole 503 extends linearly from the recess portion 502. The passage hole 501 has a linear shape in which one end is perpendicularly connected to the MC cylinder 32 and the other end is connected to the passage hole 503. The communication path 141 is open over the outer circumferential portion and the inner circumferential portion of the piston opening 171b and is connected to the cylinder bottom portion 121. The passage hole 501 may be slightly inclined with respect to the perpendicular state, instead of being perpendicular to the MC cylinder 32. That is, the passage hole 501 need only be connected to the MC cylinder 32 in a substantially perpendicular manner.

Here, a part surrounded by the cylinder bottom portion 121, a side of the cylinder wall portion 122 closer to the cylinder bottom portion 121, and the SS piston 126 serves as an SS pressure chamber 181. The SS pressure chamber 181 communicates with the secondary pressure chamber 61 of the master cylinder 26 via the communication path 141. Accordingly, in the SS pressure chamber 181, the pressure changes in accordance with movement of the SS piston 126. The axial groove 152 forms a ceiling part of this the SS pressure chamber 181. The communication path 141 is provided throughout both the MC cylinder 32 and the SS cylinder 33. The communication path 141 causes the entire SS pressure chamber 181 to communicate with the secondary pressure chamber 61 at all times. The communication path 141 is open to an upper portion of the SS pressure chamber 181 from the cylinder bottom portion 121. The communication path 141 is connected to a region of a part on a vertically upper side in the cylinder bottom portion 121 at the recess portion 502. Here, in addition to being open to a region of a part in the cylinder bottom portion 121, the communication path 141 may be open to the entire cylinder bottom portion 121. On the other hand, the communication path 141 may be open to a part of the cylinder bottom portion 121 throughout the entire diameter. The SS piston 126 defines the SS pressure chamber 181. The SS piston 126 applies a reaction force corresponding to the stepping force of the brake pedal 11 illustrated in FIG. 1 to the brake pedal 11 via the brake fluid inside the SS pressure chamber 181, the brake fluid inside the secondary pressure chamber 61, the brake fluids of the secondary piston 47, the primary pressure chamber 56 illustrated in FIG. 2, the primary piston 46 and the input rod 21.

As illustrated in FIG. 2, the partition seal 151 held by the circumferential groove 136 of the SS cylinder 33 is an integrally molded product made of synthetic rubber. The partition seal 151 is a cup seal of which the shape on one side of a radial cross-section including its central line is a C-shape. The partition seal 151 is disposed inside the circumferential groove 136 in which a lip part is in a state of being directed toward the cylinder bottom portion 121. In the partition seal 151, the inner circumference is in slide contact with the outer circumferential surface of the SS piston 126, and the outer circumference comes into contact with the circumferential groove 136 of the SS cylinder 33. Accordingly, the partition seal 151 seals the gap at the position of the partition seal 151 of the SS piston 126 and the SS cylinder 33 at all times.

The partition seal 161 held by the circumferential groove 137 of the SS cylinder 33 is an integrally molded product made of synthetic rubber. The partition seal 161 is a cup seal of which the shape on one side of a radial cross-section including its central line is a C-shape. The partition seal 161 is disposed inside the circumferential groove 137 in which a lip part is in a state of being directed toward the cylinder opening 123. In the partition seal 161, the inner circumference is in slide contact with the outer circumferential surface of the SS piston 126, and the outer circumference comes into contact with the circumferential groove 137 of the SS cylinder 33. Accordingly, the partition seal 161 can seal the gap at the position of the partition seal 161 of the SS piston 126 and the SS cylinder 33 at all times.

The reaction force generating mechanism 127 has a metal lid member 191, a rubber seal member 192, and a cushioning member 193 that is an elastic member. The lid member 191 is fitted to the large inner diameter portion 132 of the SS cylinder 33 and is screwed into the female screw portion 133. The seal member 192 is held by the lid member 191 and seals a gap between the lid member 191 and the large inner diameter portion 132 of the SS cylinder 33. The cushioning member 193 is mounted in the lid member 191.

The lid member 191 has a fitting portion 195 and a protrusion portion 196. The fitting portion 195 is fitted to the SS cylinder 33. The protrusion portion 196 has an outer diameter smaller than that of the fitting portion 195 and protrudes from the fitting portion 195 toward the cylinder bottom portion 121. A male screw portion 197, a fitting outer diameter portion 198, and a circumferential groove 199 are formed on the outer circumferential side of the fitting portion 195. The male screw portion 197 is screwed into the female screw portion 133. The fitting outer diameter portion 198 is fitted to the large inner diameter portion 132. The circumferential groove 199 is recessed radially inward from the outer diameter surface of the fitting outer diameter portion 198 and has an annular shape. The seal member 192, which is an O-ring, is disposed in the circumferential groove 199. An engagement recess portion 200 is formed in the radial middle of the fitting portion 195. The engagement recess portion 200 is recessed in the axial direction from the end surface on a side opposite to the cylinder bottom portion 121 of the fitting portion 195. A screwing tool such as a hexagonal wrench engages with the engagement recess portion 200 when the male screw portion 197 of the fitting portion 195 is screwed into the female screw portion 133 of the SS cylinder 33.

A recess portion 201 is formed on the cylinder bottom portion 121 in the radial middle of the protrusion portion 196. The recess portion 201 is recessed on a side opposite to the cylinder bottom portion 121 from a tip end surface on the side closer to the cylinder bottom portion 121 of the protrusion portion 196. A columnar cushioning member 193, which is the elastic member, is fitted and fixed in this recess portion 201. When the cushioning member 193 is in a state of being in contact with the bottom surface of the recess portion 201, the cushioning member 193 protrudes to the side closer to the cylinder bottom portion 121 than the tip end surface of the protrusion portion 196.

The reaction force generating mechanism 127 has a metal spring 206, a metal retainer 207, a metal spring unit 208, and a cushioning member 209 that is an elastic member. One end of the spring 206 comes into contact with the fitting portion 195 in a state in which the protrusion portion 196 is inserted into the inner side. The retainer 207 comes into contact with the other end of the spring 206. The spring unit 208 is interposed between the retainer 207 and the SS piston 126. The cushioning member 209 is disposed inside the spring unit 208.

As illustrated in FIG. 4, the spring 206 is a biasing mechanism (coil spring) generating a biasing force. The retainer 207 has a lid portion 221, a body portion 222, and a flange portion 223. The lid portion 221 has a disk shape. The body portion 222 extends in the axial direction from an outer circumferential edge portion of the lid portion 221 and has a cylindrical shape. The flange portion 223 extends radially outward beyond the body portion 222 from an end edge portion on a side opposite to the lid portion 221 of the body portion 222 and is formed in a circular shape. In the retainer 207, the flange portion 223 comes into contact with the end portion of the spring 206 and interlocks therewith.

The spring unit 208 has a retainer 226 and a spring 227. The retainer 226 is extendable within a predetermined range. The spring 227 is a biasing mechanism (coil spring) biasing the retainer 226 in the extending direction. The retainer 226 regulates extension of the spring 227 such that its maximum length does not exceed a predetermined length.

The retainer 226 has an interlock member 231, a guide shaft 232, and an interlock member 233. The interlock member 231 has a disk shape, comes into contact with one end of the spring 227, and interlocks therewith. The guide shaft 232 is fixed to the radial middle of the interlock member 231 and extends into the spring 227 from the interlock member 231. The guide shaft 232 includes a shaft portion 236 and a flange portion 237. The shaft portion 236 extends from the interlock member 231. The flange portion 237 extends radially outward beyond the shaft portion 236 from the end portion on a side opposite to the interlock member 231 of the shaft portion 236 and is formed in an annular shape.

The interlock member 233 has a slide portion 241, a body portion 242, and a flange portion 243. The slide portion 241 is fitted to the shaft portion 236 of the guide shaft 232 and slides on the shaft portion 236. The body portion 242 extends from the slide portion 241 to a side opposite to the interlock member 231 and has a tubular shape. The flange portion 243 extends radially outward beyond the body portion 242 from the end edge portion on a side opposite to the slide portion 241 of the body portion 242 and is formed in an annular shape. In the interlock member 233, the flange portion 243 comes into contact with the other end of the spring 227 and interlocks therewith. In the retainer 226, the slide portion 241 of the interlock member 233 comes into contact with the flange portion 237 of the guide shaft 232, thereby regulating extension of the spring 227.

In the spring unit 208, the interlock member 231 is inserted into the retainer 207 and comes into contact with the lid portion 221 of the retainer 207. In the spring unit 208, in a state in which the interlock member 233 causes the protrusion portion 173 to be fitted inside the body portion 242, the flange portion 243 is brought into contact with the piston bottom portion 172 of the SS piston 126. The cushioning member 209 is an elastic member having a cylindrical shape. The cushioning member 209 is accommodated inside the body portion 242 of the interlock member 233 in a state of being disposed between the protrusion portion 173 of the SS piston 126 and the flange portion 237 of the guide shaft 232.

A part surrounded by the SS piston 126, the cylinder wall portion 122 of the SS cylinder 33, and the lid member 191 configures a spring chamber 245. The spring chamber 245 also configures the stroke simulator 27. The spring chamber 245 is defined against the SS pressure chamber 181 by the partition seals 151 and 161 illustrated in FIG. 2.

As illustrated in FIG. 4, the cushioning member 193, the spring 206, the retainer 207, the spring unit 208, and the cushioning member 209 of the reaction force generating mechanism 127 are disposed inside this spring chamber 245. Thus, the springs 206 and 227 are disposed in the spring chamber 245. The bleeder passage 142 of the SS cylinder 33 communicates with this spring chamber 245. The spring chamber 245 communicates with the bleeder plug (not illustrated) for opening and closing this spring chamber 245 with respect to outside air. In addition, the spring chamber 245 communicates with the power module 13. In the axial groove 165 of the SS cylinder 33, one end is open inside the circumferential groove 137 and the other end is open to the spring chamber 245.

When the SS piston 126 is in a state of being in contact with the cylinder bottom portion 121 of the SS cylinder 33 as illustrated in FIG. 2, in the spring unit 208 as illustrated in FIG. 4, one end comes into contact with the piston bottom portion 172 of the SS piston 126 while being reduced in length, and the other end comes into contact with the lid portion 221 of the retainer 207. In addition, in this state, in the spring 206, one end comes into contact with the flange portion 223 of the retainer 207, and the other end comes into contact with the fitting portion 195 of the lid member 191 fixed to the SS cylinder 33. In addition, in this state, the cushioning member 193 is separated from the lid portion 221 of the retainer 207, and the cushioning member 209 is separated from the flange portion 237 of the guide shaft 232 of the spring unit 208. The springs 206 and 227 biases the SS piston 126 in a direction toward the cylinder bottom portion 121 as illustrated in FIG. 2.

The partition seal 151 is provided on the SS cylinder 33 side, in the SS cylinder 33 and the SS piston 126. Furthermore, the partition seal 151 is disposed on a side opposite to the springs 206 and 227 of the partition seal 161 of the SS piston 126. The partition seal 161 is provided on the SS cylinder 33 side, in the SS cylinder 33 and the SS piston 126. Furthermore, the partition seal 161 is disposed on the springs 206 and 227 side of the partition seal 151 of the SS piston 126.

When the primary piston 46 moves toward the cylinder bottom portion 41 in response to an input from the brake pedal 11 illustrated in FIG. 1, the primary piston 46 pressurizes the brake fluid inside the primary pressure chamber 56 as described above. The brake fluid pressurized inside the primary pressure chamber 56 is sent out from the primary discharge path 69 to the power module 13. However, in a normal state, the power module 13 blocks the fluid pressure from the primary discharge path 69.

In addition, when the primary piston 46 of the master cylinder 26 moves to the cylinder bottom portion 41 side in response to an input from the brake pedal 11, the secondary piston 47 is pressed by this primary piston 46 via the spring unit 57 and moves to the cylinder bottom portion 41 side. Consequently, the secondary piston 47 pressurizes the brake fluid inside the secondary pressure chamber 61 as described above. The brake fluid pressurized inside the secondary pressure chamber 61 is sent out from the secondary discharge path 68 to the power module 13. However, in a normal state, the power module 13 blocks the fluid pressure from the secondary discharge path 68. Therefore, the brake fluid pressurized inside the secondary pressure chamber 61 is introduced into the SS pressure chamber 181 of the stroke simulator 27 via the communication path 141 and pressurizes the brake fluid inside the SS pressure chamber 181.

Consequently, the SS piston 126 moves in a direction of being separated from the cylinder bottom portion 121, that is, a direction of approaching the lid member 191. Consequently, first, the SS piston 126 causes the spring 227 of the spring unit 208 illustrated in FIG. 4 to be reduced in length against the biasing force thereof. In this case, a reaction force corresponding to the reduced length of the spring 227 illustrated in FIG. 4 is applied to the brake pedal 11 illustrated in FIG. 1. Next, in a state in which the spring 227 remains being reduced in length, the SS piston 126 causes the cushioning member 209 to come into contact with the flange portion 237 of the guide shaft 232 and causes the cushioning member 209 to be reduced in length against the biasing force thereof. In this case, a reaction force corresponding to the reduced length of the spring 227 and the cushioning member 209 illustrated in FIG. 4 is applied to the brake pedal 11 illustrated in FIG. 1. Next, in a state in which the spring 227 and the cushioning member 209 remain being reduced in length, the SS piston 126 causes the spring 206 to be reduced in length against the biasing force thereof. In this case, a reaction force corresponding to the reduced length of the spring 227, the cushioning member 209, and the spring 206 illustrated in FIG. 4 is applied to the brake pedal 11 illustrated in FIG. 1. Next, in a state in which the spring 227, the cushioning member 209, and the spring 206 remain being reduced in length, the SS piston 126 causes the retainer 207 to come into contact with the cushioning member 193 and causes the cushioning member 193 to be reduced in length against the biasing force thereof. In this case, a reaction force corresponding to the reduced length of the spring 227, the cushioning member 209, the spring 206, and the cushioning member 193 illustrated in FIG. 4 is applied to the brake pedal 11 illustrated in FIG. 1. In this manner, the stroke simulator 27 applies a reaction force corresponding to a stepping force of the brake pedal 11 illustrated in FIG. 1 to the brake pedal 11, thereby generating pseudo-operational feeling.

As illustrated in FIG. 2, in the partition seals 151 and 161 provided with respect to the SS piston 126, the partition seal 161 is disposed on the front side (forward movement direction side) of the partition seal 151 in the traveling direction of the SS piston 126 at the time of stepping on the brake pedal 11. The partition seal 151 is disposed on the rear side (rearward movement direction side) of the partition seal 161 in the traveling direction of the SS piston 126 at the time of stepping on the brake pedal 11.

Figure 6:
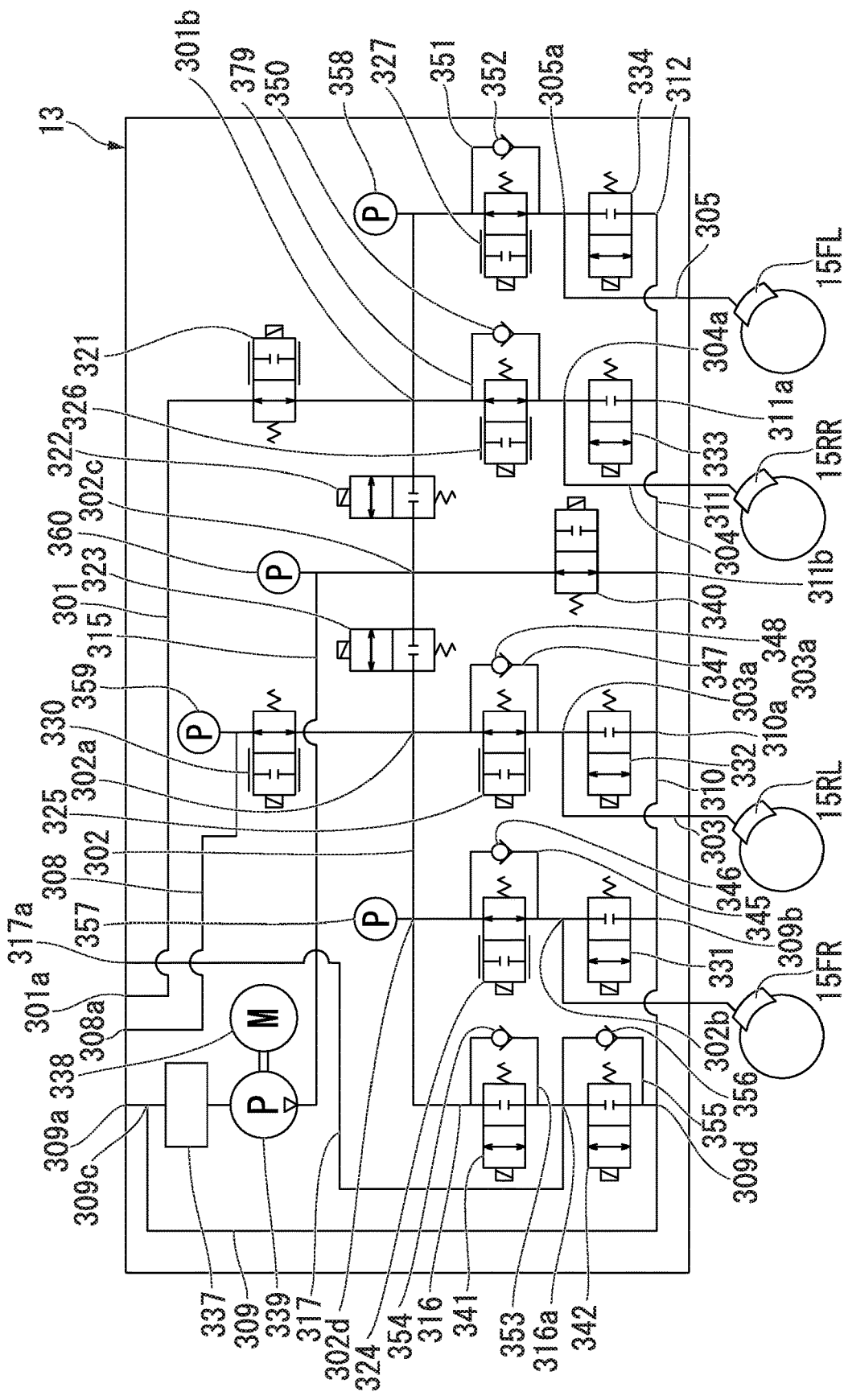
FIG. 6 is a hydraulic circuit diagram of a power module configuring the braking device together with the master cylinder unit of the first embodiment.

As illustrated in FIG. 6, the power module 13 has a passage 301, a passage 302, a passage 303, a passage 304, and a passage 305. The passage 301 communicates with the primary discharge path 69 of the master cylinder 26 illustrated in FIG. 1, through a communication port 301a at an outer end. The passage 302 is branched from a terminal position 301b in the passage 301 and communicates with the braking cylinder 15FR. The passage 303 is branched from a position 302a in the passage 302 and communicates with the braking cylinder 15RL. The passage 304 is branched from the position 301b in the passage 301 and communicates with the braking cylinder 15RR. The passage 305 is branched from the position 301b in the passage 301 and communicates with the braking cylinder 15FL.

In addition, the power module 13 has a passage 308, a passage 309, a passage 310, a passage 311, and a passage 312. The passage 308 communicates with the secondary discharge path 68 of the master cylinder 26 illustrated in FIG. 1, through a communication port 308a at an outer end. As illustrated in FIG. 6, an inner end communicates with the position 302a in the passage 302. The passage 309 is branched from a position 302b in the passage 302 and communicates with the reservoir 25 illustrated in FIG. 1 through a communication port 309a at the outer end. The passage 310 is branched from a position 303a in the passage 303 and communicates with a position 309b in the passage 309. The passage 311 is branched from a position 304a in the passage 304 and communicates with a position 310a in the passage 310. The passage 312 is branched from a position 305a in the passage 305 and communicates with a position 311a in the passage 311.

In addition, the power module 13 has a passage 315, a passage 316, and a passage 317. The passage 315 is branched from a position 309c between the communication port 309a and the position 309b in the passage 309 and communicates with a position 302c between the position 302a and the position 301b in the passage 302. The passage 315 further communicates with a position 311b between the position 311a and the position 310a in the passage 311. The passage 316 is branched from a position 302d between the position 302a and the position 302b in the passage 302 and communicates with a position 309d between the position 309b and the position 309c in the passage 309. The passage 317 is branched from a position 316a in the passage 316 and communicates with the bleeder passage 142 through a communication port 317a at the outer end as illustrated in FIG. 1.

In addition, as illustrated in FIG. 6, the power module 13 has an opening/closing valve 321, an opening/closing valve 322, an opening/closing valve 323, and an opening/closing valve 324. The opening/closing valve 321 is provided at an intermediate position in the passage 301 and opens and closes the passage 301. The opening/closing valve 322 is provided between the position 301b and the position 302c in the passage 302 and opens and closes the passage 302. The opening/closing valve 323 is provided between the position 302a and the position 302c in the passage 302 and opens and closes the passage 302. The opening/closing valve 324 is provided between the position 302b and the position 302d in the passage 302 and opens and closes the passage 302.

In addition, the power module 13 has an opening/closing valve 325, an opening/closing valve 326, and an opening/closing valve 327. The opening/closing valve 325 is provided between the position 302a and the position 303a in the passage 303 and opens and closes the passage 303. The opening/closing valve 326 is provided between the position 301b and the position 304a in the passage 304 and opens and closes the passage 304. The opening/closing valve 327 is provided between the position 301b and the position 305a in the passage 305 and opens and closes the passage 305.

In addition, the power module 13 has an opening/closing valve 330, an opening/closing valve 331, an opening/closing valve 332, an opening/closing valve 333, and an opening/closing valve 334. The opening/closing valve 330 is provided in an intermediate position in the passage 308 and opens and closes the passage 308. The opening/closing valve 331 is provided between the position 302b and the position 309b in the passage 309 and opens and closes the passage 309. The opening/closing valve 332 is provided between the position 303a and the position 310a in the passage 310 and opens and closes the passage 310. The opening/closing valve 333 is provided between the position 304a and the position 311a in the passage 311 and opens and closes the passage 311. The opening/closing valve 334 is provided between the position 305a and the position 311a in the passage 312 and opens and closes the passage 312.

In addition, the power module 13 has a reservoir 337 and a pump 339. The reservoir 337 is provided between the position 309c and the position 302c in the passage 315, communicates with the reservoir 25 of the master cylinder unit 12 illustrated in FIG. 1, and contains the brake fluid. The pump 339 illustrated in FIG. 6 is driven by a motor 338, suctions the brake fluid from the reservoir 337, and discharges the brake fluid toward the position 302c. The pump 339 is provided on the side closer to the position 302c than the reservoir 337.

In addition, the power module 13 has an opening/closing valve 340, an opening/closing valve 341, and an opening/closing valve 342. The opening/closing valve 340 is provided between the position 302c and the position 311b in the passage 315 and opens and closes the passage 315. The opening/closing valve 341 is provided between the position 302d and the position 316a in the passage 316 and opens and closes the passage 316. The opening/closing valve 342 is provided between the position 316a and the position 309d in the passage 316 and opens and closes the passage 316.

Here, the opening/closing valves 321, 324, 325, 326, 327, 330, and 340 are in an opened state as illustrated in FIG. 6 in a non-driven state in which the valves are not electrically driven and are in a closed state in a driven state in which the valves are electrically driven. In addition, the opening/closing valves 322, 323, 331, 332, 333, 334, 341, and 342 are in a closed state as illustrated in FIG. 6 in a non-driven state in which the valves are not electrically driven and are in an opened state in a driven state in which the valves are electrically driven.

The power module 13 has a bypass passage 345, a check valve 346, a bypass passage 347, a check valve 348, a bypass passage 349, and a check valve 350. The bypass passage 345 bypasses the opening/closing valve 324 and connects the position 302b and the position 302d in the passage 302 to each other. The check valve 346 is provided in the bypass passage 345 and allows the brake fluid to flow only from the position 302b to the position 302d. The bypass passage 347 bypasses the opening/closing valve 325 and connects the position 303a and the position 302a in the passage 303 to each other. The check valve 348 is provided in the bypass passage 347 and allows the brake fluid to flow only from the position 303a to the position 302a. The bypass passage 349 bypasses the opening/closing valve 326 and connects the position 304a and the position 301b in the passage 304 to each other. The check valve 350 is provided in the bypass passage 349 and allows the brake fluid to flow only from the position 304a to the position 301b side.

In addition, the power module 13 has a bypass passage 351, a check valve 352, a bypass passage 353, a check valve 354, a bypass passage 355, and a check valve 356. The bypass passage 351 bypasses the opening/closing valve 327 and connects the position 305a and the position 301b in the passage 305 to each other. The check valve 352 is provided in the bypass passage 351 and allows the brake fluid to flow only from the position 305a to the position 301b side. The bypass passage 353 bypasses the opening/closing valve 341 and connects the position 316a and the position 302d in the passage 316 to each other. The check valve 354 is provided in the bypass passage 353 and allows the brake fluid to flow only from the position 316a to the position 302d. The bypass passage 355 bypasses the opening/closing valve 342 and connects the position 316a and the position 309d of the passage 316 to each other. The check valve 356 allows the brake fluid to flow only from the position 309d to the position 316a in the bypass passage 355.

In addition, the power module 13 has a pressure sensor 357, a pressure sensor 358, a pressure sensor 359, and a pressure sensor 360. The pressure sensor 357 is connected to the position 302d in the passage 302 and detects the pressure of this part. The pressure sensor 358 is connected to a location between the position 301b in the passage 305, and the opening/closing valve 327 and the check valve 352 and detects the pressure of this part. The pressure sensor 359 is connected to a location between the communication port 308a and the opening/closing valve 330 in the passage 308 and detects the pressure of this part. The pressure sensor 360 is connected to a location between the pump 339 and the position 302c in the passage 315 and detects the pressure of this part.

In the braking device 10, when a driver steps on the brake pedal 11 in a normal power supply state, the input rod 21 moves toward the cylinder bottom portion 41 of the master cylinder 26. Consequently, the stroke sensor 22 detects this movement of the input rod 21. In accordance with this detection, the opening/closing valves 321 and 330 of the power module 13 are electrically driven and are in a closed state. The opening/closing valves 322 and 323 are electrically driven and are in an opened state. The opening/closing valve 340 is electrically driven and is in a closed state. Here, at the time of normally stepping on the brake pedal 11, the opening/closing valve 342 is electrically driven and is in an opened state. At the time of suddenly stepping on the brake pedal 11, the opening/closing valve 342 is not electrically driven and is in a closed state.

When the opening/closing valves 321 and 330 are in a closed state as described above, the passage 301 and the passage 308 are closed. Consequently, the opening/closing valves 321 and 330 blocks the brake fluid from being supplied from the secondary discharge path 68 and the primary discharge path 69 of the master cylinder 26 to the braking cylinders 15FR, 15RL, 15RR, and 15FL. Accordingly, when the primary piston 46 and the secondary piston 47 move toward the cylinder bottom portion 41 in accordance with the movement of the input rod 21, the brake fluid of the secondary pressure chamber 61 is introduced into the SS pressure chamber 181 of the stroke simulator 27 via the communication path 141. As a result, the fluid pressure of the SS pressure chamber 181 rises so that the SS piston 126 moves in a direction toward the lid member 191. Accordingly, a reaction force corresponding to a stepping force of the brake pedal 11 is applied to the brake pedal 11 by means of the spring 227 of the spring unit 208, the cushioning member 209, the spring 206, and the cushioning member 193, thereby generating pseudo-operational feeling.

In addition, as described above, when the opening/closing valves 322 and 323 are electrically driven and are in an opened state, and when the opening/closing valve 340 are electrically driven and are in a closed state, the pump 339 communicates with the braking cylinders 15FR, 15RL, 15RR, and 15FL. In this case, the pump 339 communicates with the braking cylinders 15FR, 15RL, 15RR, and 15FL via a part from the pump 339 to the position 302c in the passage 315, and the passages 302 to 305. Then, the motor 338 is driven based on the movement amount of the input rod 21, and the like detected by the stroke sensor 22. Consequently, the pump 339 suctions the brake fluid from the reservoir 337 and the reservoir 25 and discharges the brake fluid. The discharged brake fluid is supplied to the braking cylinder 15FR through the passage 315 via the passage 302 between the position 302c and the braking cylinder 15FR. In addition, the discharged brake fluid is supplied to the braking cylinder 15RL through the passage 315 via the passage 302 between the position 302c and the position 302a, and the passage 303. In addition, the discharged brake fluid is supplied to the braking cylinder 15RR through the passage 315 via the passage 302 between the position 302c and the position 301b, and the passage 304. In addition, the discharge brake fluid is supplied to the braking cylinder 15FL through the passage 315 via the passage 302 between the position 302c and the position 301b, and the passage 305. In this manner, the braking cylinders 15FR, 15RL, 15RR, and 15FL are pressurized. Accordingly, a brake is applied to the wheels.

Here, at the time of failure of power supply, the opening/closing valves 321 and 330 of the power module 13 are not electrically driven and are in an opened state. Thus, the opening/closing valves 321 and 330 throw the passage 301 and the passage 308 open. In addition, the opening/closing valves 322, 323, and 341 are in a closed state, the opening/closing valves 324 to 327 are in an opened state, and the opening/closing valves 331 to 334 and 342 are in a closed state. Thus, the brake fluid discharged from the primary pressure chamber 56 of the master cylinder 26 to the passage 301 via the primary discharge path 69 is supplied to each of the braking cylinder 15RR via the passage 304, and the braking cylinder 15FL via the passage 305. In addition, the brake fluid discharged from the secondary pressure chamber 61 of the master cylinder 26 to the passage 308 via the secondary discharge path 68 is supplied to each of the braking cylinder 15FR via the passage 302 between the position 302a and the braking cylinder 15FR, and the braking cylinder 15RL via the passage 303.

At the time of air bleeding of the braking device 10, the primary pressure chamber 56 of the master cylinder 26, the secondary pressure chamber 61, and the SS pressure chamber 181 of the stroke simulator 27 are subjected to air bleeding. In this case, since the SS pressure chamber 181 communicates with the secondary pressure chamber 61 via the communication path 141, the SS pressure chamber 181 is subjected to air bleeding together with the secondary pressure chamber 61. Next, the spring chamber 245 of the stroke simulator 27 is subjected to air bleeding.

The communication path 141 causing the SS pressure chamber 181 and the secondary pressure chamber 61 to communicate with each other has a shape such that its position becomes higher in the vertical direction as the communication path 141 becoming closer to the secondary pressure chamber 61. Therefore, at the time of air bleeding of the SS pressure chamber 181 of the stroke simulator 27, air in the SS pressure chamber 181 is smoothly subjected to air bleeding from the communication path 141 to the secondary discharge path 68 via the secondary pressure chamber 61. Therefore, there is no need to provide a bleeder passage and a bleeder plug for air bleeding of the SS pressure chamber 181 in the SS cylinder 33.

The braking device disclosed in Patent Literature 1 includes a stroke simulator which applies a reaction force corresponding to a stepping force of a brake pedal to the brake pedal. In such a braking device, it is desired that the configuration for air bleeding is simplified.

The first embodiment includes the communication path 141 causing the master cylinder 26 and the stroke simulator 27 to communicate with each other. The stroke simulator 27 includes a bottomed tube-shaped SS piston 126 and the SS cylinder 33 in which the SS piston 126 slides. The SS piston 126 is disposed such that the cylinder bottom portion 121 and the piston opening 171b face each other. The communication path 141 is open over the outer circumferential portion and the inner circumferential portion of the piston opening 171b and is connected to the cylinder bottom portion 121. The communication path 141 is provided such that the communication path 141 extends upward in the vertical direction as approaching to the secondary pressure chamber 61 from the cylinder bottom portion 121. Therefore, air in the SS pressure chamber 181 is capable of smoothly being moved to the secondary pressure chamber 61. Thus, a configuration for air bleeding of the SS pressure chamber 181 can be simplified.

In addition, in the recess portion 502, the communication path 141 is connected to a region of a part on a vertically upper side in the cylinder bottom portion 121. Therefore, compared to a case of being formed throughout the entire cylinder bottom portion 121 or the entire diameter thereof, the processing man-hour can be reduced, so that manufacturing efficiency is improved.

In addition, the axial groove 152, which is a recess portion recessed radially outward beyond the piston opening 171b side from the partition seal 151 to the cylinder bottom portion 121 is provided in a part on the side closer to the piston bottom portion 172 than the cylinder bottom portion 121 of the SS cylinder 33. Therefore, air in the circumferential groove 136 in which the partition seal 151 is disposed can also be smoothly subjected to air bleeding.

In addition, in the first embodiment, the cylinder bottom portion 121 to which the communication path 141 is connected is recessed compared to a part to which the communication path 141 is not connected. In the cylinder bottom portion 121, the communication path 141 extends radially outward. Therefore, air in the SS pressure chamber 181 is capable of smoothly being moved to the secondary pressure chamber 61. Thus, a configuration for air bleeding of the SS pressure chamber 181 can be simplified.

In the first embodiment, even if the SS piston 126 is in a state of being in contact with the cylinder bottom portion 121, the communication path 141 including the recess portion 502 is simultaneously open to the inner circumferential side and the outer circumferential side of the SS piston 126 and communicates with both thereof. In other words, the communication path 141 communicates with the inner circumferential side and the outer circumferential side of the SS piston 126 at all times. Therefore, the communication path 141 causes air in the SS pressure chamber 181 between the SS cylinder 33 and the SS piston 126 to flow to the secondary pressure chamber 61. Thus, there is no need to provide a bleeder passage and a bleeder plug only for air bleeding of the SS pressure chamber 181. That is, processing for a bleeder passage is no longer necessary as well as a bleeder plug and its assembling. In addition, there is no need to form ports radially penetrating the cylindrical portion 171 on a side on which the SS pressure chamber 181 of the cylindrical portion 171 of the SS piston 126 is formed. That is, processing for ports is no longer necessary. Therefore, the configuration for air bleeding can be simplified, and the cost can be reduced.

In addition, the communication path 141 includes the recess portion 502, the passage hole 503, and the passage hole 501. The recess portion 502 is provided in the cylinder bottom portion 121 in a recessed manner. The passage hole 503 extends linearly from the recess portion 502. In the passage hole 501, one end is linearly connected to the MC cylinder 32 in a substantially perpendicular manner and the other end is connected to the passage hole 503. Therefore, the communication path 141 can favorably communicate with the inner circumferential side and the outer circumferential side of the SS piston 126 due to the recess portion 502. Therefore, air bleeding of the SS pressure chamber 181 can be favorably performed.

Second Embodiment

Figure 7:
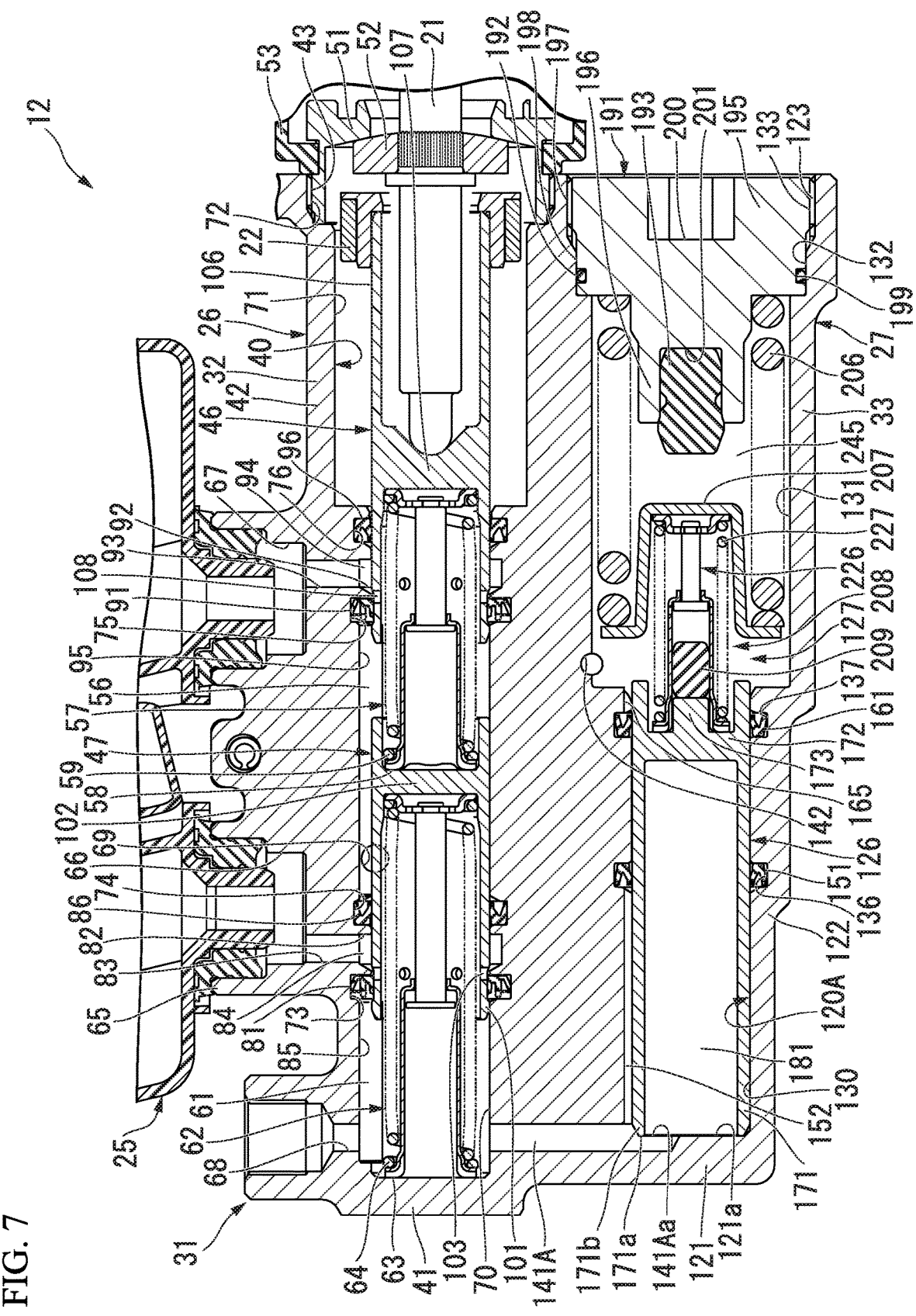
FIG. 7 is a cross-sectional view of a master cylinder unit of a second embodiment.

Next, a second embodiment will be described mainly based on FIGS. 7 and 8 focusing on the differences from the first embodiment. Portions in common with those of the first embodiment are expressed using the same names and the same reference signs.

In the second embodiment, a cylinder hole 120A deeper than the cylinder hole 120 of the first embodiment is provided in the stroke simulator 27. In the second embodiment, a communication path 141A partially different from the communication path 141 is provided in the stroke simulator 27.

This communication path 141A has a linear shape. This communication path 141A extends vertically downward from the cylinder hole 40 of the MC cylinder 32 and extends to a location in the vicinity of the central axial line of the cylinder hole 120 of the SS cylinder 33. The communication path 141A communicates with the axial groove 152. The communication path 141A is recessed in a direction opposite to the cylinder opening 123 beyond the main bottom surface 121a of the cylinder bottom portion 121 in a direction of the central axial line of the cylinder hole 120.

Figure 8:
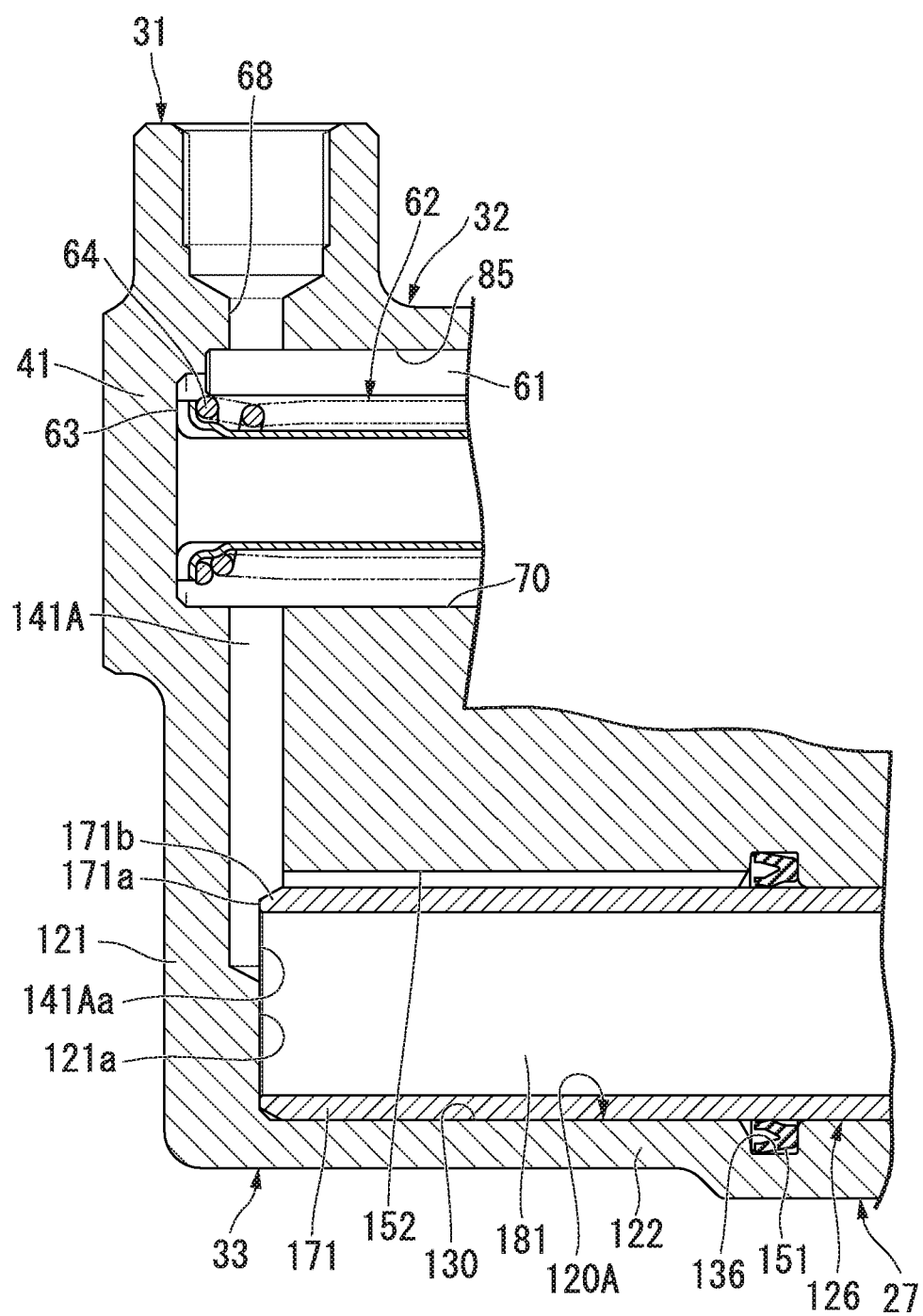
FIG. 8 is a partial cross-sectional view of the master cylinder unit of the second embodiment.

The communication path 141A, which is also illustrated in FIG. 8, has a circular cross-sectional shape except for the opening part toward the cylinder hole 120A. The communication path 141A is formed coaxially with the secondary discharge path 68 on the same straight line as the secondary discharge path 68 of the master cylinder 26 while having the same diameter. Thus, the secondary discharge path 68 and the communication path 141A are formed through hole opening performed once using one drill. In the communication path 141A, similar to the secondary discharge path 68, the central axial line is also orthogonal to the central axial line of the cylinder hole 40.

An end edge portion 141Aa on the boundary between the main bottom surface 121a and the communication path 141A is at a position of radially crossing the end surface 171a of the cylindrical portion 171 of the SS piston 126. Thus, even if the SS piston 126 is in a state of being in contact with the cylinder bottom portion 121, the communication path 141A is simultaneously open to the inner circumferential side and the outer circumferential side of the SS piston 126 and communicates with both thereof. As a result, even if the SS piston 126 is in a state of being in contact with the cylinder bottom portion 121, the communication path 141A causes the axial groove 152 and the inside of the cylindrical portion 171 to communicate with each other. That is, the communication path 141A communicates with the inner circumferential side and the outer circumferential side at all times regardless of the position of the SS piston 126 and causes the axial groove 152 and the inside of the cylindrical portion 171 to communicate with each other at all times. The communication path 141A is open over the outer circumferential portion and the inner circumferential portion of the piston opening 171b. The communication path 141A is connected to the cylinder bottom portion 121. The cylinder bottom portion 121 to which the communication path 141A is connected is recessed compared to a part to which the communication path 141 is not connected, and the communication path 141A extends radially outward. The communication path 141A extends linearly from the SS cylinder 33 to be perpendicular to the SS cylinder 33 and is perpendicularly connected to the secondary pressure chamber 61. The communication path 141A perpendicularly extends linearly from the SS cylinder 121 and is perpendicularly connected to the MC cylinder 32. The communication path 141A extends upward from the cylinder hole 120A in the vertical direction. Thus, the communication path 141A is provided such that the communication path 141A extends upward in the vertical direction as approaching to the secondary pressure chamber 61 from the cylinder bottom portion 121. The communication path 141A is connected to a region of a part on the vertically upper side in the cylinder bottom portion 121. Here, in addition to being open to a region of a part in the cylinder bottom portion 121, the communication path 141A may be open to the entire cylinder bottom portion 121. The communication path 141A may be slightly inclined with respect to the perpendicular state, instead of being perpendicular to the MC cylinder 32 and the SS cylinder 33. That is, the communication path 141A need only be connected to the MC cylinder 32 and the SS cylinder 33 in a substantially perpendicular manner. The communication path 141A need only extend linearly from the cylinder bottom portion 121 to the SS cylinder 33 in a substantially perpendicular manner and to be connected to the secondary pressure chamber 61 in a substantially perpendicular manner. The communication path 141A provided throughout both the MC cylinder 32 and the SS cylinder 33 causes the entire SS pressure chamber 181 to communicate with the secondary pressure chamber 61 at all times.

In the second embodiment, the communication path 141A perpendicularly extends linearly from the MC cylinder 32 and is perpendicularly connected to the SS cylinder 33. Therefore, the configuration of the communication path 141A can further simplified, so that processing for forming the communication path 141A is facilitated and the cost can be further reduced.

The embodiments described above include a reservoir which accommodates a brake fluid for a brake, a master cylinder which exchanges the brake fluid with the reservoir, and a stroke simulator which exchanges the brake fluid with the master cylinder. The master cylinder includes a master cylinder piston which linearly moves in response to a stepping force of a brake pedal, and a first pressure chamber in which the pressure changes in accordance with the movement of the master cylinder piston. The stroke simulator includes the stroke simulator piston which applies a reaction force in response to a stepping force of the brake pedal, and a second pressure chamber in which the pressure changes in accordance with the movement of the stroke simulator piston. A communication path which causes the first pressure chamber and the second pressure chamber to communicate with each other is provided. The communication path communicates with the inner circumferential side and the outer circumferential side of the stroke simulator piston. The communication path causes air in the second pressure chamber to flow to the first pressure chamber. Thus, there is no need to provide a bleeder passage and a bleeder plug only for air bleeding of the second pressure chamber. In addition, there is no need to provide ports for causing the inner circumferential side and the outer circumferential side to communicate with each other, in a part configuring the second pressure chamber of the stroke simulator piston. Therefore, the configuration for air bleeding can be simplified and the cost can be reduced.

In addition, the communication path includes a recess portion which is provided on a facing portion of a stroke simulator cylinder facing a tip end portion of the stroke simulator piston to be recessed in a direction of being apart from the tip end portion of the stroke simulator piston, a first communication portion which extends linearly from the recess portion, and a linear second communication portion in which one end is connected to a cylinder for a master cylinder in a substantially perpendicular manner and the other end is connected to the first communication portion. Therefore, the communication path can favorably communicate with the inner circumferential side and the outer circumferential side of the stroke simulator piston due to the recess portion. Therefore, air bleeding of the second pressure chamber can be favorably performed.

In addition, the communication path extends linearly from the cylinder for a master cylinder in a substantially perpendicular manner and is connected to the stroke simulator cylinder in a substantially perpendicular manner. Therefore, the communication path can be easily formed. Therefore, the configuration for air bleeding can be further simplified and the cost can be further reduced.

As a master cylinder unit based on the embodiments described above, for example, it is possible to take the following aspects into consideration.

As a first aspect, a master cylinder unit includes a master cylinder that causes a fluid pressure to be generated in a pressure chamber inside a cylinder in accordance with an operation amount of a brake pedal, a reservoir that supplies a brake fluid to the pressure chamber, a stroke simulator that communicates with the pressure chamber and applies a reaction force corresponding to an operation force of the brake pedal to the brake pedal, and a communication path that causes the master cylinder and the stroke simulator to communicate with each other. The stroke simulator includes a bottomed tube-shaped simulator piston and a simulator cylinder in which the simulator piston slides. The simulator piston is disposed such that a bottom portion of the simulator cylinder and an opening portion of the simulator piston face each other. The communication path is open over an outer circumferential portion and an inner circumferential portion of the opening portion of the simulator piston, is connected to the bottom portion of the simulator cylinder, and is provided such that the communication path extends upward in a vertical direction from the bottom portion of the simulator cylinder as approaching to the pressure chamber.

As a second aspect, in the first aspect, the communication path is connected to a region on an upper side in the vertical direction in the bottom portion of the simulator cylinder.

As a third aspect, in the first or second aspect, in the simulator cylinder, a seal member partitioning the simulator piston bottom portion side and the simulator piston opening side is provided between the outer circumferential portion of the simulator piston and the simulator cylinder. A recess portion recessed radially outward beyond the simulator piston opening side from the seal member to the bottom portion of the simulator cylinder is provided in a part of the simulator cylinder on the simulator piston bottom portion side.

As a fourth aspect, in any one of the first to third aspects, the communication path extends linearly from the bottom portion of the simulator cylinder in a substantially perpendicular manner and is connected to the pressure chamber in a substantially perpendicular manner.

As a fifth aspect, a master cylinder unit includes a master cylinder that causes a fluid pressure to be generated in a pressure chamber inside a cylinder in accordance with an operation amount of a brake pedal, a reservoir that supplies a brake fluid to the pressure chamber, a stroke simulator that communicates with the pressure chamber and applies a reaction force corresponding to an operation force of the brake pedal to the brake pedal, and a communication path that causes the master cylinder and the stroke simulator to communicate with each other. The stroke simulator includes a bottomed tube-shaped simulator piston and a simulator cylinder in which the simulator piston slides. The simulator piston is disposed such that a bottom portion of the simulator cylinder and an opening portion of the simulator piston face each other. The communication path is connected to the bottom portion of the simulator cylinder. The bottom portion of the simulator cylinder to which the communication path is connected is recessed compared to a part to which the communication path is not connected, and the communication path extends radially outward.

INDUSTRIAL APPLICABILITY

According to the master cylinder unit described above, a configuration for air bleeding can be simplified.

REFERENCE SIGNS LIST

11 Brake pedal
12 Master cylinder unit
25 Reservoir
26 Master cylinder
27 Stroke simulator
32 MC cylinder (cylinder)
33 SS cylinder (simulator cylinder)
61 Secondary pressure chamber (pressure chamber)
121 Cylinder bottom portion (bottom portion of simulator cylinder)
126 SS piston (simulator piston)
141 Communication path
151 Partition seal (seal member)
152 Axial groove (recess portion)
171b Piston opening (opening portion of simulator piston)
172 Piston bottom portion (simulator piston bottom portion)

The invention claimed is:
1. A master cylinder unit comprising:
a master cylinder that causes a fluid pressure to be generated in a pressure chamber inside a cylinder in accordance with an operation amount of a brake pedal;
a reservoir that supplies a brake fluid to the pressure chamber;
a stroke simulator that communicates with the pressure chamber and applies a reaction force corresponding to an operation force of the brake pedal to the brake pedal; and
a communication path that causes the master cylinder and the stroke simulator to communicate with each other,
wherein the stroke simulator includes a bottomed tube-shaped simulator piston and a simulator cylinder in which the simulator piston slides,
wherein a cylinder hole is provided in the simulator cylinder,
wherein the cylinder hole comprises a cylinder bottom portion and a cylinder wall portion,
wherein the simulator piston is disposed such that the cylinder bottom portion and an opening portion of the simulator piston face each other,
wherein a space is formed by the opening portion between an end portion of the simulator piston at the bottom side and the bottom portion of the simulator cylinder, wherein the communication path comprises a recess portion provided in the cylinder bottom portion and a passage hole communicated with the recess portion, wherein the communication path is open over an outer circumferential portion and an inner circumferential portion of the opening portion of the simulator piston, wherein the communication path connects the space and the master cylinder, and wherein the passage hole of the communication path is provided such that the communication path extends upward in a vertical direction from the bottom portion of the simulator cylinder as approaching to the pressure chamber.

2. The master cylinder unit according to claim 1, wherein the communication path is connected to a region on an upper side in the vertical direction in the bottom portion of the simulator cylinder.

3. The master cylinder unit according to claim 1, wherein, in the simulator cylinder, a seal member partitioning the simulator piston bottom portion side and the simulator piston opening side is provided between the outer circumferential portion of the simulator piston and the simulator cylinder, and wherein a recess portion recessed radially outward beyond the simulator piston opening side from the seal member to the bottom portion of the simulator cylinder is provided in a part of the simulator cylinder on the simulator piston bottom portion side.

4. The master cylinder unit according to according to claim 1, wherein the communication path extends linearly from the bottom portion of the simulator cylinder in a substantially perpendicular manner and is connected to the pressure chamber in a substantially perpendicular manner.

5. A master cylinder unit comprising:

a master cylinder that causes a fluid pressure to be generated in a pressure chamber inside a cylinder in accordance with an operation amount of a brake pedal;

a reservoir that supplies a brake fluid to the pressure chamber;

a stroke simulator that communicates with the pressure chamber and applies a reaction force corresponding to an operation force of the brake pedal to the brake pedal; and a communication path that causes the master cylinder and the stroke simulator to communicate with each other, wherein the stroke simulator includes a bottomed tube-shaped simulator piston and a simulator cylinder in which the simulator piston slides, wherein a cylinder hole is provided in the simulator cylinder, wherein the cylinder hole comprises a cylinder bottom portion and a cylinder wall portion, wherein the simulator piston is disposed such that the cylinder bottom portion and an opening portion of the simulator piston face each other, wherein a space is formed by the opening portion between an end portion of the simulator piston at the bottom side and the bottom portion of the simulator cylinder, wherein the communication path comprises a recess portion provided in the cylinder bottom portion and a passage hole communicated with the recess portion, wherein the communication path connects the space and the master cylinder, and wherein the cylinder bottom portion to which the communication path is connected is recessed compared to a part to which the communication path is not connected, and the communication path extends radially outward.

* * * * *